(12) United States Patent
Mizutani et al.

(10) Patent No.: US 6,592,645 B1
(45) Date of Patent: Jul. 15, 2003

(54) METHOD FOR PRODUCING FINE POWDER OF METALLIC NICKEL COMPRISED OF FINE SPHERICAL PARTICLES

(75) Inventors: Hideto Mizutani, Osaka (JP); Minoru Yoneda, Osaka (JP); Toshihiro Sugaya, Osaka (JP); Hiroyoshi Urasumi, Osaka (JP); Chiyo Honda, Osaka (JP); Hiroshi Nakao, Osaka (JP); Tsutomu Hatanaka, Osaka (JP); Shinji Ohgama, Osaka (JP); Kiyoshi Fukai, Osaka (JP); Kazuhiko Nagano, Osaka (JP); Shigefumi Kamisaka, Osaka (JP); Kazunobu Abe, Osaka (JP)

(73) Assignee: Sakai Chemical Industry Co., Ltd., Osaka (JP)

( * ) Notice: Subject to any disclaimer, the term of this patent is extended or adjusted under 35 U.S.C. 154(b) by 2 days.

(21) Appl. No.: 09/889,490

(22) PCT Filed: Nov. 10, 2000

(86) PCT No.: PCT/JP00/07986

§ 371 (c)(1),
(2), (4) Date: Jul. 18, 2001

(87) PCT Pub. No.: WO01/38024

PCT Pub. Date: May 31, 2001

(30) Foreign Application Priority Data

Nov. 19, 1999 (JP) .......................................... 11-330517

(51) Int. Cl.$^7$ ................................................. B22F 9/18
(52) U.S. Cl. ......................................... 75/365; 75/374
(58) Field of Search ..................................... 75/365, 374

(56) References Cited

U.S. PATENT DOCUMENTS 5,071,635 A  12/1991  Yamanaka et al.
6,197,273 B1 *  3/2001  Nagano et al. .......... 423/419.1

FOREIGN PATENT DOCUMENTS

| JP | 2-59432 | 2/1990 |
| JP | 10-102109 | 4/1998 |
| JP | 11-140513 | 5/1999 |
| JP | 11-014557 | * 8/2000 |

* cited by examiner

Primary Examiner—Roy King
Assistant Examiner—Andrew Wessman
(74) Attorney, Agent, or Firm—Wenderoth, Lind & Ponack L.L.P.

(57) ABSTRACT

A process for the production of fine powder of metallic nickel which comprises a first step of dissolving nickel carbonate and/or nickel hydroxide in aqueous ammonia or in an aqueous solution of ammonia and at least one selected from the group consisting of ammonium carbonate, ammonium hydrogencarbonate, a carbonate of an alkali metal and a hydrogencarbonate of an alkali metal to prepare an aqueous solution of a nickel salt; converting the aqueous solution of a nickel salt to a W/O emulsion, and then removing volatile components including ammonia from the droplets to form precipitates of nickel carbonate in the droplets, thereby providing fine spherical particles of nickel carbonate; and a second step of heating the particles of nickel carbonate in the presence of a fusion preventive agent that is a compound of at least one element selected from the group consisting of alkaline earth elements, aluminum, silicon and rare earth elements in an atmosphere of hydrogen, thereby reducing the nickel carbonate to metallic nickel.

12 Claims, 10 Drawing Sheets

METHOD FOR PRODUCING FINE POWDER OF METALLIC NICKEL COMPRISED OF FINE SPHERICAL PARTICLES

FIELD OF THE INVENTION

The invention relates to a process for the production of powder comprised of fine spherical particles of metallic nickel. More particularly, the invention relates to a process for the production of powder comprised of fine spherical particles of metallic nickel which have an average particle size of 0.05 to 10 μm, preferably 0.1 μm to several microns, and most preferably 0.1 to 1 μm and a narrow particle size distribution, which are comprised of high crystallinity metallic nickel. Accordingly, the powder of fine spherical particles of metallic nickel produced by the invention is suitable for use as inner electrodes of laminated ceramic capacitors.

DESCRIPTION OF PRIOR ART

With recent progress of development of small-sized electronic parts having large capacity, more small-sized laminated ceramic capacitors with large capacitance are demanded. A laminated ceramic capacitor is produced as follows. Dielectric green sheets are prepared by using powder of ceramic dielectrics such as barium titanate and a binder such as polyvinyl butyral. A paste containing powder of a noble metal such as palladium or platinum for inner electrodes is coated on the green sheet by a printing process and dried. Then, a plurality of the green sheets are placed in layers and heated so that they are bound to each other and the dielectric sheets and the inner electrodes are laminated alternately.

The resulting laminated product is then cut to an appropriate size and calcined at a temperature of about 1300° C. so that the inner electrodes and ceramic dielectric are sintered while removing the binder used therefrom. Finally, outer electrodes are formed with, for example, silver.

As clear from the foregoing, it is necessary that the metal for use as inner electrodes does not melt at a temperature at which the ceramic dielectric used sinters, and besides, it is not oxidized. Accordingly, expensive noble metals such as platinum or palladium are used thus far as inner electrodes as mentioned above to make laminated ceramic capacitors expensive as well.

Thus, recently, a number of studies have been made to put inexpensive laminated ceramic capacitors to practical use in which a base metal, nickel, is used as inner electrodes in place of the conventional expensive laminated ceramic capacitors in which platinum or palladium is used as inner electrodes. However, there is a problem here.

Inner electrodes of laminated ceramic capacitors are limited by the size of the powder of a metal used to form inner electrodes. That is, the inner electrode cannot be thinner than the particle size of the metal powder. The thickness of the inner electrode is usually in the range of one or two microns. Consequently, when a powder of a metal having a particle size of more than one micron is used, the electrode layer becomes non-uniform and there is a fear that continuity defects will arise. In addition, when ceramic dielectric sheets having thereon a coating of a metal to form inner electrodes are placed in layers and laminated, the layer of inner electrode may penetrate through the dielectric layer to cause bad insulation between the dielectric layers.

Therefore, it is demanded that powder of metallic nickel for use as inner electrodes of laminated ceramic capacitors has a particle size in the range of about 0.1 micron to one micron, and besides, it has a narrow particle size distribution, taking packing efficiency of the powder into consideration.

Although a variety of methods have been heretofore proposed to produce fine powder of metallic nickel having such properties as mentioned above, any method already known is apt to produce particles having crystal habit such as of cubic system. Thus, there is disclosed a method in which vapor of nickel chloride is reduced with hydrogen in a gas phase under a low partial pressure of nickel chloride in Japanese Patent Application Laid-Open No. 4-365806, however, this method is costly.

Of course, a method in which various metal compounds including metal oxides are heated and reduced at high temperatures under a pressurized hydrogen gas, as described in a Japanese Patent Laid-Open No. 53-16437, however, any such method has hitherto failed to produce such powder of fine spherical particles of metallic nickel as demanded.

The present inventors have paid attention to oxidation and reduction of nickel salt as a means to produce a powder of fine spherical particles of metallic nickel inexpensively and easily, and have made extensive studies along those lines. As a result, the inventors have succeeded in obtaining a powder of fine spherical particles of nickel carbonate having a uniform particle size, and have found that, if necessary, after oxidizing the fine powder of nickel carbonate to fine powder of nickel oxide, the powder is heated under a hydrogen atmosphere to reduce the powder in the presence of fusion preventive agent, thereby providing a powder of fine spherical particles of metallic nickel in high yields, and have thus completed the invention.

Nickel carbonate is usually in the form of amorphous or non-spherical fine particles, although it is described in Japanese Patent Application Laid-Open No. 2-59432 that fine spherical particles of nickel carbonate can be produced by a method in which an emulsion is used as a reaction field (medium).

Recently, inclusive of the above-mentioned method as described in Japanese Patent Application Laid-Open No. 2-59432, a method in which a W/O emulsion is made use of as a reaction field attracts considerable attention as a means to produce fine spherical particles of inorganic salts having a uniform particle size.

According to such a method, an aqueous solution of water-soluble inorganic salt is added to an organic solvent together with a surfactant, and the resultant mixture is stirred thereby preparing a W/O emulsion, and then a neutralizer (an acid or an alkali is mixed with the emulsion so that a water-insoluble salt is precipitated in the form of fine spherical particles within the fine droplets of the solution.

However, according to such a method in which a W/O emulsion is made use of as a reaction field, the emulsion is easily broken not only on account of a neutralizer used such as an acid or an alkali but also on account of salts by-produced when water-insoluble nickel salts are formed. Accordingly, it is difficult to maintain the reaction field stable throughout the reaction and hence it has been difficult to obtain fine spherical particles of nickel salts having a uniform particle size by a method which makes use of emulsion as a reaction field.

In addition, even if fine spherical particles of nickel salts are obtained, the particles fail to retain their spherical form in the course of oxidation or reduction, for example, so that fine spherical particles of metallic nickel have not been obtained hitherto successfully.

On the other hand, in particular, when powder of metallic nickel is produced by heating and reducing nickel compounds in a hydrogen atmosphere, the generated particles of metallic nickel have tendency to fuse together so that it is difficult to produce fine spherical particles of metallic nickel having a particle size of 10 microns or less in good yields.

The present invention has been completed to solve the various problems as mentioned above involved in the production of fine spherical particles of metallic nickel.

Therefore, it is an object of the invention to provide a process for the production of powder comprised of fine spherical particles of metallic nickel which have an average particle size of 0.05 $\mu$m to 10 $\mu$m, preferably 0.1 $\mu$m to several microns, in particular, preferably 0.1 to 1 $\mu$m, and a narrow particle size distribution and which are comprised of high crystallinity metallic nickel, so that they are suitable for use as inner electrodes for laminated ceramic capacitors, in good yields while preventing particles of metallic nickel from fusing together.

SUMMARY OF THE INVENTION

The invention provides a process for the production of powder comprised of fine spherical particles of metallic nickel having an average particle size of 0.05 to 10 $\mu$m, which comprises:

a first stage of dissolving nickel carbonate and/or nickel hydroxide represented by the general formula (I)

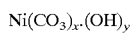
$Ni(CO_3)_x \cdot (OH)_y$ wherein x and y are numerals which satisfy the conditions: $0 \leq x \leq 1.5$ and $0 \leq y \leq 3$, respectively, in aqueous ammonia or in an aqueous solution of ammonia and at least one selected from the group consisting of ammonium carbonate, ammonium hydrogencarbonate, a carbonate of an alkali metal and a hydrogencarbonate of an alkali metal to prepare an aqueous solution of a nickel salt; and converting the aqueous solution of a nickel salt to a W/O emulsion containing droplets of the aqueous solution in a non-aqueous medium and then removing volatile components including ammonia from the droplets to form precipitates of nickel carbonate in the droplets, thereby providing fine spherical particles of nickel carbonate; and a second stage of heating the particles of nickel carbonate in the presence of a fusion preventive agent that is a compound of at least one element selected from the group consisting of alkaline earth elements, aluminum, silicon and rare earth elements in an amount of 0.01% by weight to 30% by weight in terms of oxides based on the weight of the nickel carbonate in an atmosphere of hydrogen, thereby reducing the particles of nickel carbonate to particles of metallic nickel.

The invention provides a further process (second process of the invention) for the production of powder comprised of fine spherical particles of metallic nickel having an average particle size of 0.05–10 $\mu$m, which comprises:

a first stage of dissolving nickel carbonate and/or nickel hydroxide represented by the general formula (I)

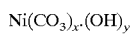
$Ni(CO_3)_x \cdot (OH)_y$ wherein x and y are numerals which satisfy the conditions: $0 \leq x \leq 1.5$ and $0 \leq y \leq 3$, respectively, in aqueous ammonia or in an aqueous solution of ammonia and at least one selected from the group consisting of ammonium carbonate, ammonium hydrogencarbonate, a carbonate of an alkali metal and a hydrogencarbonate of an alkali metal to prepare an aqueous solution of a nickel salt; and converting the aqueous solution of a nickel salt to a W/O emulsion containing droplets of the aqueous solution in a non-aqueous medium and then removing volatile components including ammonia from the droplets to form precipitates of nickel carbonate in the droplets, thereby providing fine spherical particles of nickel carbonate; and a second stage of heating the particles of nickel carbonate in an oxidative atmosphere to provide fine spherical particles of nickel oxide; and then heating the particles of nickel oxide in the presence of a fusion preventive agent that is a compound of at least one element selected from the group consisting of alkaline earth elements, aluminum, silicon and rare earth elements in an amount of 0.01% by weight to 30% by weight in terms of oxides based on the weight of the nickel oxide in an atmosphere of hydrogen, thereby reducing the particles of nickel oxide to particles of metallic nickel.

In brief, according to the second method of the invention, fine spherical particles of nickel carbonate are produced in the first step in the same manner as the first process, but in the second step of the second process, the nickel carbonate is then first thermally decomposed to fine spherical particles of nickel oxide, and then the particles of nickel oxide are reduced to provide fine spherical particles of metallic nickel.

DESCRIPTION OF PREFERRED EMBODIMENTS

Figure 1:
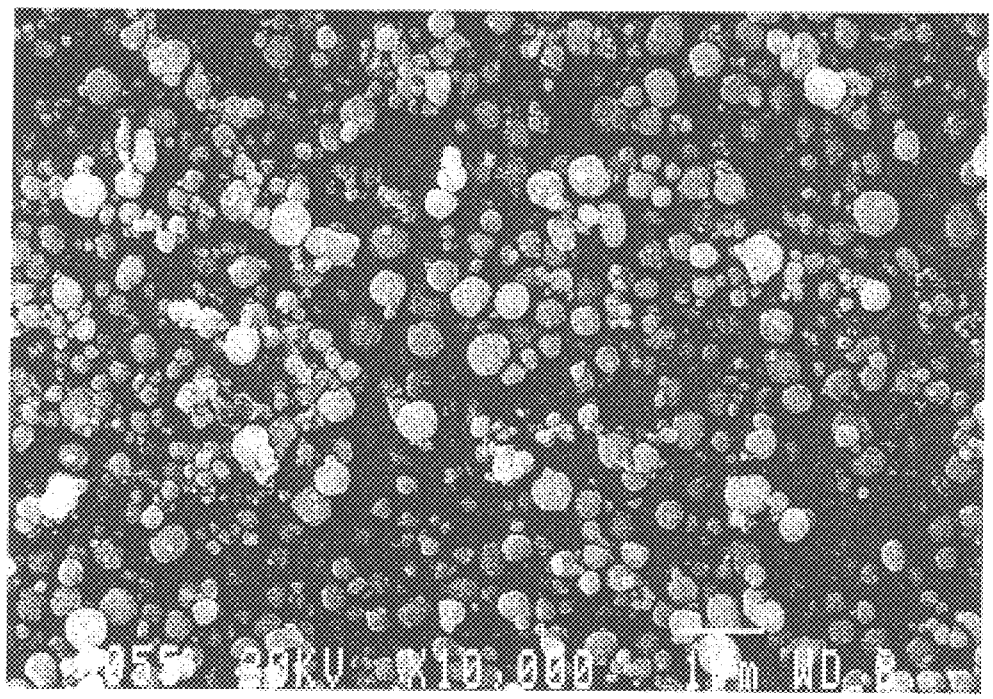
FIG. 1 is a scanning electron micrograph of particles of metallic nickel prepared in Example 32.

According to the process of the invention, as a starting nickel compound by the reduction of which metallic nickel is produced is used nickel carbonate which is produced by a specific emulsion process using nickel carbonate, nickel hydroxide or a mixture of these compounds as a raw material represented by the above-mentioned general formula (I), as described in detail hereinafter. Herein the invention, the nickel carbonate used as a starting nickel compound by the reduction of which metallic nickel is produced includes nickel carbonate (normal salt) and basic nickel carbonate (basic salt), and besides the starting nickel compound may include nickel hydroxide.

The process for the production of fine spherical particles of metallic nickel having an average particle size of 0.05–10

μm comprises two steps. The first stage is to produce fine spherical particles of nickel carbonate and the second stage is to produce fine spherical particles of metallic nickel by reducing the particles of nickel carbonate to fine spherical particles of metallic nickel. If necessary, the particles of nickel carbonate are heated in an oxidative atmosphere to thermally decompose to fine powder of nickel oxide, and then it is reduced to fine powder of particles of metallic nickel.

(The First Stage)

The first stage of producing fine spherical particles of nickel carbonate is first described. In the first stage of the process of the invention, nickel carbonate and/or nickel hydroxide represented by the general formula (I)

$$Ni(CO_3)_x \cdot (OH)_y$$

wherein x and y are numerals which satisfy the conditions: $0 \leq x \leq 1.5$ and $0 \leq y \leq 3$, respectively, is dissolved in an aqueous ammonia or in an aqueous solution of ammonia and at least one selected from the group consisting of ammonium carbonate, ammonium hydrogencarbonate, a carbonate of an alkali metal and a hydrogencarbonate of an alkali metal to prepare an aqueous solution of a nickel salt; the aqueous solution is then converted to a W/O emulsion containing droplets of the aqueous solution in a non-aqueous medium; and then volatile components including ammonia are removing from the droplets to form precipitates of nickel carbonate in the droplets, thereby providing fine spherical particles of nickel carbonate.

According to the invention, nickel carbonate or nickel hydroxide or a mixture of these nickel compounds represented by the general formula (I) are used as a starting material or raw material to produce fine spherical particles of nickel carbonate by an emulsion process. Herein the invention, the above-mentioned nickel carbonate includes normal salts and basic salts, and these carbonates may contain hydroxides.

With regard to the nickel carbonate or nickel hydroxide or a mixture of these nickel compounds represented by the general formula (I), the nickel atom may be divalent or trivalent, or may have a valence between two and three.

The starting material expressed by the general formula (I), that is, nickel carbonate or nickel hydroxide or a mixture of these nickel compounds may be prepared by any method or means. For example, nickel carbonate may be produced by neutralizing inorganic or organic salts such as chlorides, sulfates, nitrates or acetates of nickel with carbonate ion-containing alkali carbonates such as sodium carbonate or ammonium carbonate.

The starting material may contain, as impurities, ions of elements other than nickel, such as iron, copper, cobalt, manganese, calcium, cerium or yttrium.

Hereinafter nickel carbonate or nickel hydroxide or a mixture of these nickel compounds represented by the general formula (I) used as a starting material in the process of the invention are simply referred to as the nickel carbonate or nickel hydroxide.

Further according to the invention, when an aqueous solution is prepared by dissolving the nickel carbonate or nickel hydroxide in aqueous ammonia, inorganic or organic salts of nickel such as chlorides, sulfates, nitrates or acetates of nickel may be dissolved in aqueous ammonia and, if necessary, they may be reacted with ammonia therein.

When the nickel carbonate or nickel hydroxide is dissolved in aqueous ammonia, it is preferred that the aqueous ammonia contains such compounds as ammonium carbonate, ammonium hydrogencarbonate, carbonates of alkali metals or hydrogencarbonates of alkali metals in addition to ammonia. Hereunder those compounds as mentioned above are often referred simply to (hydrogen) carbonates.

The above-mentioned alkali metal is preferably, for example, lithium, potassium or sodium. Accordingly, the carbonates or hydrogencarbonates of alkali metals may be exemplified by, for example, lithium carbonate, lithium hydrogencarbonate, potassium carbonate, potassium hydrogencarbonate, sodium carbonate or sodium hydrogencarbonate. Among the hydrogen)carbonates, ammonium hydrogencarbonate is most preferred.

According to the invention, nickel carbonate or nickel hydroxide is dissolved in aqueous ammonia containing the (hydrogen)carbonate and the resulting solution is converted to a W/O emulsion containing droplets of the solution in a non-aqueous medium, and then nickel carbonate is precipitated in the droplets in the emulsion either by removing volatile components including ammonia from within the droplets or by adding an acid to the emulsion and neutralizing the droplets.

Therefore, as an embodiment of the process of the invention, the nickel carbonate or nickel hydroxide is dissolved in aqueous ammonia containing (hydrogen) carbonates, and the resulting solution is converted to a W/O emulsion containing droplets of the solution in a non-aqueous medium, and then nickel carbonate is precipitated in the droplets in the emulsion by removing volatile components including ammonia (mainly composed of ammonia and carbon dioxide) from within the droplets, and then, if necessary, volatile components mainly composed of water are further evaporated from within the droplets to dry the nickel carbonate in the droplets. The thus obtained nickel carbonate is separated by, for example, centrifugation, washed and dried to provide desired fine spherical particles of nickel carbonate.

Among a number of embodiments of the invention, it is preferred, in particular, that the nickel carbonate or nickel hydroxide is dissolved in aqueous ammonia containing ammonium hydrogencarbonate or ammonium carbonate and having a pH of 8.0–11.5, and the resulting solution is mixed with a non-aqueous medium to convert the solution to an emulsion, and then suction is applied to the emulsion under a reduced pressure to evaporate volatile components containing ammonia (e.g., ammonia, carbon dioxide and water) thereby precipitating nickel carbonate in the droplets of the solution in the emulsion. The precipitates are then recovered as fine spherical particles of nickel carbonate. This embodiment is most preferred in the invention.

According to the invention, it is preferred that the nickel carbonate or nickel hydroxide is dissolved in an aqueous ammonia at a pH in the range of 8.0 to 11.5, although not limited thereto. It is easy to adjust the pH of the aqueous solution in which the nickel carbonate or nickel hydroxide is dissolved by using (hydrogen)carbonates in combination with ammonia. It is also easy to dissolve the nickel carbonate or nickel hydroxide in such aqueous ammonia.

The concentration of the aqueous solution prepared by dissolving the nickel carbonate or nickel hydroxide in an aqueous ammonia is not specifically limited, but it is usually in the range of 0.1 mol/L to a saturated concentration, and preferably in the range of 0.3 to 1.2 mol/L.

The thus prepared aqueous solution of the nickel salt is then mixed with a non-aqueous medium and stirred in the presence of a surfactant to prepare an emulsion in a conventional manner per se well known. It is preferred that a more hydrophilic surfactant is added to the aqueous solution of the nickel salt and, if necessary, the solution is heated to a temperature less than 50° C. so that ammonia does not evaporate and the surfactant is dissolved in the solution. On the other hand, it is preferred that a more lipophilic surfactant is added to the non-aqueous medium, and if necessary, the non-aqueous medium is heated to dissolve the surfactant therein. Usually a W/O emulsion is prepared by gradually adding the aqueous solution of the nickel salt to the non-aqueous medium while stirring the non-aqueous medium using a disperser so that fine droplets of the aqueous solution of the nickel salt are dispersed, thereby providing a W/O emulsion.

The average particle size and particle size distribution of the fine spherical particles of nickel carbonate finally obtained are controllable by suitably adjusting the average particle size and particle size distribution of the water phase (droplets) in the emulsion, or concentration of aqueous solution of the nickel salt. In turn, the average particle size and particle size distribution of the water phase (droplets) in the emulsion are controllable by suitable combination of the surfactants used and the amounts thereof, the type of disperser used and stirring rate employed. In this manner, the average particle size of particles of nickel carbonate obtained is controllable in the range of 0.05 to 100 µm, preferably in the range of 0.1 to 100 µm, and most preferably in the range of 0.1 to 50 µm.

In particular, according to a preferred embodiment of the invention, fine, uniform and spherical particles of nickel carbonate are obtained by controlling or adjusting the average particle size and particle size distribution of the water phase (droplets) in the emulsion.

The non-aqueous medium by use of which the emulsion is prepared is preferably water-insoluble and, not volatile or only slightly volatile, and thus stable when being treated under a reduced or the normal pressure, as mentioned hereafter. Accordingly, for example, a non-aqueous medium that has a solubility in water is not more than 5% and has a boiling point higher than that of water is preferred.

Examples of such non-aqueous media include aliphatic hydrocarbons such as n-octene, isooctene, squalan or kerosene, alicyclic hydrocarbons such as cyclooctane, cyclononane or cyclodecane, aromatic hydrocarbons such as toluene, ethylbenzene, isopropylbenzene, cumene, mesitylene or tetralin, ethers such as butyl ether or isobutyl ether, halogenated hydrocarbons such as dichloropentanes, and aliphatic carboxylic acid esters such as n-propyl acetate, n-butyl acetate, isobutyl acetate, n-amyl acetate, isoamyl acetate, isobutyl propionate, ethyl butyrate and butyl butyrate, and a mixture of two or more of these.

In addition to the above, there may be mentioned as examples of non-aqueous media usable in the invention, natural oils such as mineral oil or, animal or vegetable oils, and synthetic oils such as hydrocarbon oil, ester oil, ether oil, fluorine-containing lubricant, phosphorus fluorine-containing lubricant or silicon-lubricant.

In particular, according to the invention, when nickel carbonate is precipitated in the droplets by evaporating volatile components including ammonia from within the droplets in the emulsion, a hydrocarbon solvent which is water-insoluble and has a small vaporization pressure is preferably used as a non-aqueous medium, such as, for example, an aliphatic hydrocarbon solvent having a boiling point of not less than 100° C. under the normal pressure. However, when the nickel carbonate or nickel hydroxide is precipitated in the droplets in the emulsion by neutralizing the ammonia in the droplets by adding an acid to the emulsion, as described hereafter, there is no need to use such a non-aqueous medium that has a low vaporization pressure, but there can be used a non-aqueous medium that has a low boiling point.

The surfactant used for preparing an emulsion is chosen depending on the individual non-aqueous medium used. Although not limited, a stable W/O emulsion may be prepared as follows. A hydrophilic surfactant having a hydrophile-lypophile balance (HLB) value of not less than 10 is dissolved in the aqueous solution (water phase) of the nickel salt while a lypophilic surfactant having an HLB value of not more than 10 is dissolved in the non-aqueous medium (oil phase), and the water phase and oil phase are mixed together in order to obtain a stable emulsion.

The amount of surfactant used is determined depending on a water/oil ratio (W/O ratio) employed and a desired particle size of the droplets in the resulting emulsion. Although not limited, it is not more than 20% by weight, preferably in the range of 5 to 15% by weight, based on the weight of the emulsion. As hereafter described, when surfactants are dissolved in both of the water phase and the oil phase, a first surfactant is dissolved in the water phase in an amount of not more than 20% by weight, preferably in an amount of 0.5 to 15% by weight, based on the amount of the water phase while a second surfactant is dissolved in the oil phase in an amount of not more than 20% by weight, preferably in an amount of 0.5 to 15% by weight, based on the amount of the oil phase.

The W/O ratio in the emulsion depends on the individual non-aqueous media used and their properties, especially their viscosity, as well as on the individual surfactants used and their properties, especially their HLB values. However, it is usually in the range of 3/2 to 1/10, preferably 1/1 to 1/5, and most preferably 1/3 to 1/5, although not limited thereto.

Nonionic surfactants having an HLB value of not less than used for the preparation of emulsion include, for example, polyoxyethylene sorbitan fatty acid esters such as polyoxyethylene sorbitan monolaurate, polyoxyethylene sorbitan monolpalmitate, polyoxyethylene sorbitan monostearate, polyoxyethylene sorbitan tristearate, polyoxyethylene sorbitan monooleate or polyoxyethylene sorbitan trioleate, polyoxyethylene fatty acid esters such as polyethylene glycol monolaurate, polyethylene glycol monostearate, polyethylene glycol distearate or polyethyleneglycol monooleate, polyoxyethylene higher alkyl ethers such as polyoxyethylene lauryl ether, polyoxyethylene cetyl ether, polyoxyethylene stearyl ether or polyoxyethylene oleyl ether, polyoxyethylene higher alkyl aryl ethers such as polyoxyethylene octylphenyl oleyl ether or polyoxyethylene nonylphenyl ether.

Nonionic surfactants having an HLB value of not more than 10 used for the preparation of emulsion include, for example, sorbitan fatty acid esters such as sorbitan monolaurate, sorbitan monopalmitate, sorbitan monostearate, sorbitan distearate, sorbitan tristearate, sorbitan monooleate or sorbitan trioleate, and glycerin fatty acid esters such as glycerin monostearate or glycerin monooleate.

As set forth above, as one aspect of the invention, desired fine spherical particles of nickel carbonate are obtained as follows. That is, the nickel carbonate or nickel hydroxide is dissolved in aqueous ammonia containing a (hydrogen) carbonate and the resulting solution of nickel salt is dispersed in the form of droplets of the solution in a non-aqueous medium to prepare a W/O emulsion. The emulsion is then stirred or aerated under the normal pressure, if necessary with heating, or suction is applied to the emulsion under a reduced pressure, to evaporate volatile components mainly comprising ammonia and carbon dioxide from within the droplets, thereby to precipitate nickel carbonate in the droplets in the emulsion. If desired, further volatile components mainly comprising water are then evaporated from within the droplets to dry the nickel carbonate formed in the droplets in the emulsion. The thus obtained nickel carbonate is then separated by, for example, centrifugation, washed and dried to provide the desired fine particles of nickel carbonate.

As a further aspect of the invention, the desired fine spherical particles of nickel carbonate are also obtained as follows. That is, the nickel carbonate or nickel hydroxide is dissolved in aqueous ammonia containing a (hydrogen) carbonate and the resulting solution of nickel salt is dispersed in the form of droplets of the solution in a non-aqueous medium to prepare a W/O emulsion. The emulsion is then stirred or aerated under the normal pressure, if necessary with heating, or suction is applied to the emulsion under a reduced pressure, to evaporate volatile components mainly comprising ammonia and carbon dioxide from within the droplets, thereby to precipitate nickel carbonate in the droplets in the emulsion. Then, the thus formed spherical precipitates are separated by a suitable means, for example, by centrifugation or filtration, washed and dried, thereby providing the desired fine particles of nickel carbonate.

According to the invention, it is preferred that the emulsion is subjected to aeration usually at a temperature of not more than 100° C. under the normal pressure or the emulsion is subjected to suction under a reduced pressure to evaporate volatile components including ammonia from within the droplets in the emulsion. However, it is especially preferred that suction is applied to the emulsion with heating under a reduced pressure.

When suction is applied to the emulsion in this manner, the temperature and pressure conditions are not specifically limited, but the pressure is usually under the atmospheric pressure, preferably under a reduced pressure (vacuum) of 400 mmHg or less, while the limit of the reduced pressure (vacuum) may be about 5 mmHg, although depending on economy of operation. The temperature may range from 0° C. to 90° C., and preferably from 10° C. to 80° C., and most preferably from 20° C. to 70° C .

In particular, good results are obtained when suction is applied to the emulsion using an aspirator, and accordingly under a reduced pressure of about 10 to 50 mmHg, while the emulsion is heated at a temperature of 20° C. to 70° C. to evaporate volatile components such ammonia and others from within the droplets in the emulsion.

However, the emulsion may be simply stirred under the normal pressure to evaporate volatile components including ammonia from within the droplets of the solution in the emulsion. Alternately, air may be blown into the emulsion, i.e., the emulsion may be aerated under the normal pressure, if necessary with heating.

Further according to the invention, desired fine spherical particles of nickel carbonate are obtained as follows. That is, the nickel carbonate or nickel hydroxide is dissolved in aqueous ammonia containing a (hydrogen)carbonate and the resulting solution is dispersed as fine droplets in a non-aqueous medium to prepare an emulsion. An acid is then added to the emulsion to neutralize the droplets, more specifically ammonia in the droplets, thereby precipitating nickel carbonate in the droplets. The thus formed nickel carbonate is dried in the emulsion as described hereinbefore and separated by, for example, centrifugation, washed and dried, thereby providing desired fine spherical particles of nickel carbonate.

Any inorganic acid or organic acid is usable in the above-mentioned process. Examples of inorganic acids include, for example, nitric acid, hydrochloric acid or sulfuric acid, and examples of organic acids include, for example, formic acid, oxalic acid, acetic acid, methanesulfonic acid, ethanesulfonic acid, benzenesulfonic acid or p-toluenesulfonic acid. Among these acids, however, an inorganic acid is preferred, and nitric acid is most preferred.

(The Second Stage)

The second stage is described. The second stage is to produce fine spherical particles of metallic nickel using fine spherical particles of carbonate produced in the first stage as a raw material.

In the second stage, if necessary, after the particles of nickel carbonate are heated in an oxidative atmosphere to thermally decompose to fine spherical particles of nickel oxide (the step of thermal decomposition of nickel carbonate), the particles of the nickel carbonate or nickel oxide (which are hereunder referred to the starting particles of nickel compounds) are heated in a hydrogen atmosphere in the presence of a fusion preventive agent that is a water-insoluble compound of at least one element selected from the group consisting of alkaline earth elements, aluminum, silicon and rare earth elements to reduce the starting particles of nickel compounds thereby providing particles of metallic nickel (the reduction step). Then, if necessary, the particles of metallic nickel are heated in a non-oxidative atmosphere (the step of heating the particles of metallic nickel in a non-oxidative atmosphere), and then if necessary, the fusion preventive agent is separated and removed from the particles of metallic nickel (the removing step of fusion preventive agent). In this manner, desired powder of fine spherical particles of metallic nickel is obtained.

(Step of Thermal Decomposition of Nickel Carbonate)

The fine spherical particles of nickel carbonate obtained in the first stage may be heated in an oxidative atmosphere, for example, in the air to decompose them to particles of nickel oxide, if necessary, before they are reduced.

There is a fear that the particles of nickel carbonate obtained in the first stage have carbonaceous substance adhered thereonto which are derived from the non-aqueous medium or the surface active agent used in the emulsion process wherein the particles of nickel carbonate have been produced. The thermal decomposition of particles of nickel carbonate can not only remove such carbonaceous substance from the particles, but also sinter the particles of nickel oxide to form finer spherical particles.

According to the invention, the particles of nickel carbonate are thermally decomposed by heating the particles in an atmosphere, for example, in the air, at a rate of 5–50° C./hr to a temperature usually of 400–1000° C., preferably to a temperature of 450–800° C., and then heating the particles at the temperature for several hours, usually for 1–10 hours.

If necessary, the particles of nickel oxide obtained by the thermal decomposition of particles of nickel carbonate are ground by a dry method, a wet method, or a combination of these methods, and then supplied to the next reduction step.

(Step of Reduction of Particles of Starting Nickel Compounds)

According to the invention, the particles of starting nickel compounds are heated in a hydrogen atmosphere in the presence of a fusion preventive agent that is a compound of at least one element selected from the group consisting of alkaline earth elements, aluminum, silicon and rare earth elements to reduce the particles, thereby providing powder of spherical particles of metallic nickel.

It is preferred that the fusion preventive agent is a water-insoluble compound of the above-mentioned element so that it is added to an aqueous slurry of the particles of starting nickel compounds to form a uniform mixture.

It is in particular preferred that the fusion preventive agent is a water-insoluble hydroxide, oxide, carbonate or sulfate of the above-mentioned element or a mixture of two or more of these compounds. All of the hydroxides and oxides of the above-mentioned element are effective fusion preventive agents. Carbonates and sulfates of the above-mentioned element are also effective fusion preventive agents if they are water-insoluble. The oxides may be anhydrides, or may be hydrates.

Among the elements that form the fusion preventive agents, there are mentioned, for example, Mg, Ca, Sr or Ba as the alkaline earth element, with Mg or Ca being in particular preferred. In turn, there are mentioned, for example, as the rare earth element, Sc, Y, La, Ce, Pr, Nd, Pm, Sm, Eu, Gd, Tb, Dy, Ho, Er, Tm, Yb or Lu. Among the compounds of these elements, those of Y, Sm or Pr, or a mixture of two or more of these compounds are preferred since they are highly fusion-preventive.

The fusion preventive agent that is a compound of at least one element selected from the group consisting of alkaline earth elements, aluminum, silicon and rare earth elements may be used singly or as a combination of two or more.

In more particular, there are mentioned as preferred examples of compounds of alkaline earth elements useful as fusion preventive agents, for example, calcium oxide or magnesium oxide, and in addition, calcium carbonate or barium sulfate. There are mentioned as preferred examples of compounds of silicon or aluminum useful as fusion preventive agents, for example, their oxides or hydroxides. Preferred examples of compounds of rare earth elements useful as fusion preventive agents are, for example, their oxides or hydroxides.

The fusion preventive agent is present as solid while the particles of starting nickel compounds are reduced and are then heated in a non-oxidative atmosphere thereby preventing the particles of metallic nickel produced by the reduction of particles of starting nickel compounds from fusing to each other, and thus growing to large particles. The fusion preventive agent is used usually in an amount of 0.01–30% by weight, preferably in an amount of 1–25% by weight, in terms of oxides, based on the weight of the particles of starting nickel compounds.

According to the invention, it is enough that the fusion preventive agent is present together with the particles of starting nickel compounds when they are reduced. Therefore, the fusion preventive agent may be made present together with the particles of starting nickel compounds by any methods or means when they are reduced. That is, there is no limitation how to add the fusion preventive agent to the starting nickel compounds.

For example, the fusion preventive agent may be added directly to the particles of starting nickel compounds and dry-mixed. The fusion preventive agent may be wet-mixed with the particles of starting nickel compounds. The latter is preferred since a uniform mixture of the fusion preventive agent and the particles of starting nickel compounds are formed.

By way of examples, when a mixture of the particles of starting nickel compounds and the fusion preventive agent are prepared by a wet method, and a water-insoluble oxide such as silica or alumina is used as a fusion preventive agent, it may be added as is to an aqueous slurry of the particles of starting nickel compounds and then mixed and pulverized.

In more detail, silica or alumina is dispersed in water together with the particles of starting nickel compounds, and then the resulting mixture is mixed and stirred, or mixed and pulverized using a ball mill or the like using beads as pulverizing media. Alternately, an aqueous dispersion of silica or alumina is prepared while an aqueous dispersion of the particles of starting nickel compounds is prepared separately, and then the dispersions are each pulverized using a ball mill or the like using pulverizing media, followed by combining them together and pulverizing.

However, according to invention, it is preferred that an aqueous dispersion of the particles of starting nickel compounds is prepared, and in the presence of such particles of starting nickel compounds, an acid or an alkali is added to an aqueous solution of water-soluble salts (i.e., precursors of fusion preventive agents) that give oxides or hydroxides when they are reacted with the acid or alkali to generate a fusion preventive agent in situ, thereby preparing a mixture of the particles of starting nickel compounds and the a fusion preventive agent.

For example, a water-soluble salt of such an element as silicon, aluminum, alkaline earth metals or rare earth metals are dissolved in water to prepare an aqueous solution, the solution is mixed with an aqueous dispersion of the particles of starting nickel compounds, and then, depending on the water-soluble salt used, an acid or an alkali is added to the resulting mixture as a precipitant to precipitates of the element. The resulting mixture is then mixed and stirred and thus, a mixture of the particles of starting nickel compounds and a fusion preventive agent is obtained. The precipitant used includes, for instance, an acid such as hydrochloric acid or an alkali such as sodium hydroxide, sodium carbonate or aqueous ammonia.

There may be used as the precursor that provides hydroxides or oxides of silicon or aluminum, for example, orthosilicic acid, metasilicic acid, sodium orthosilicate, potassium metasilicate, sodium aluminate, aluminum nitrate, aluminum sulfate or aluminum chloride. There may be used as the precursor that provides hydroxides or oxides of rare earth metals, for example, water-soluble salts such as nitrates, sulfates, carbonates or chlorides. However, the precursor of fusion preventive agent is not limited to those exemplified above.

According to the invention, it is particularly preferred that the following methods are employed in order to prepare a uniform mixture of the particles of starting nickel compounds and a fusion preventive agent.

As a first method, the particles of starting nickel compound are dispersed in water using a ball mill or a mill wherein beads are used as pulverizing media to prepare a slurry, and then, after a water-soluble salt or a precursor that gives a fusion preventive agent, such as sodium metasilicate or aluminum nitrate is added to the slurry, an acid or an alkali is added to the slurry to form precipitates of silicon dioxide or aluminum oxide, followed by stirring to provide a mixture of the particles of starting nickel compound and the fusion preventive agent.

As a further method, the particles of starting nickel compound are dispersed in water using a ball mill or a mill wherein beads are used as pulverizing media to prepare a slurry, and then, after an acid or an alkali is added to the slurry, a water-soluble salt or a precursor that gives a fusion preventive agent, such as sodium metasilicate or aluminum nitrate is added to the slurry to form precipitates of silicon dioxide or aluminum oxide, followed by stirring to provide a mixture of the particles of starting nickel compound and the fusion preventive agent.

As a still further method, the particles of starting nickel compound are dispersed in water using a ball mill or a mill wherein beads are used as pulverizing media to prepare a slurry, and then a water-soluble salt or a precursor that gives a fusion preventive agent and an acid or an alkali are simultaneously added to the slurry to form precipitates of silicon dioxide or aluminum oxide, followed by stirring to provide a mixture of the particles of starting nickel compound and the fusion preventive agent.

The above methods have been explained by taking a case in which silicon dioxide or aluminum oxide is used as a fusion preventive agent as examples, however, the above methods are preferably employed as well when a mixture of a fusion preventive agent that is a water-insoluble compound of alkaline earth metals or rare earth metals and the particles of starting nickel compound are prepared.

When a mixture of the particles of starting nickel compound and a fusion preventive agent is prepared in a wet method in this way using a slurry of the particles of starting nickel compound, the resulting slurry is filtered, washed, dried and pulverized, and the thus obtained particles of starting nickel compound containing a fusion preventive agent are used in the next reduction step.

A mixture of the particles of starting nickel compound and a fusion preventive agent may be prepared by a further method, too. That is, the particles of starting nickel compound are dispersed in water using a ball mill or a mill wherein beads are used as pulverizing media to prepare a slurry, and then, after a water-soluble salt or the precursor that gives a fusion preventive agent is added to the slurry, the resulting mixture is spray-dried. The mixture is then, if necessary, pulverized and supplied to the reduction step.

(Reduction Step)

According to the invention, the mixture of the particles of starting nickel compound and a fusion preventive agent are heated in a hydrogen atmosphere at a temperature in the range of 300–1200° C. to reduce the particles of starting nickel compound to provide fine spherical particles of metallic nickel. When the particles of starting nickel compound are heated at a temperature lower than 300° C., the particles of starting nickel compound are not reduced to a sufficient degree, resulting in unreduced nickel compounds remaining, whereas when the particles of starting nickel compound are heated at a temperature higher than 1200° C., the resultant particles of metallic nickel have a predominant crystal habit of the hexagonal system which nickel originally possesses so that they are undesirably inferior in sphericality. Furthermore, the reduction at such a high temperature using a hydrogen gas needs expensive apparatus from the viewpoints either of material or of structure, and is not desirable.

(Step of Heating Powder of Metallic Nickel in a Non-oxidative Atmosphere)

Then according to the invention, after the reduction of the particles of starting nickel compound by heating at a relative low temperature, for example, at a temperature preferably of 300–700° C., for long time, as mentioned above, they are heated at a high temperature in a non-oxidative atmosphere of, e.g., in a nitrogen gas atmosphere so that they are sintered and the crystallinity of the resulting particles of metallic nickel is improved.

The temperature at which powder of metallic nickel is heated in a non-oxidative atmosphere is preferably in the range of between 500° C. and 1500° C. When the temperature is lower than 500° C., the improvement in crystallinity of the resulting metallic nickel is not sufficient, whereas when the temperature is higher than 1500° C., the resulting particles of metallic nickel come to have the form of liquid droplets and the fusion preventive agent sinters or fuses to each other, thereby causing agglomeration of particles of metallic nickel. In addition, it is difficult for the particles of metallic nickel to maintain their sphericality after the heating.

(Step of Removal of Fusion Preventive Agent)

After the particles of starting nickel compound are reduced in the presence of fusion preventive agent to provide particles of metallic nickel and if necessary, the particles of metallic nickel are heated in a non-oxidative atmosphere, the resulting powder of metallic nickel are washed with an acid or an alkali to dissolve the fusion preventive agent therein and remove from the powder of metallic nickel. The amount of the acid or alkali used is not specifically limited, but the dissolution of particles of metallic nickel should be avoided.

When silicon dioxide is used as a fusion preventive agent, for example, and it is to be removed from the obtained particles of metallic nickel, an alkali such as sodium hydroxide is preferably used, while when aluminum oxide is used as a fusion preventive agent, for example, and it is to be removed from the obtained particles of metallic nickel, an acid such as hydrochloric acid is preferably used as well as an alkali such as sodium hydroxide. When a fusion preventive agent used is a hydroxide or an oxides of alkaline earth metals or rare earth metals, it is removed from the resulting powder of metallic nickel using hydrochloric acid or an organic acid such as acetic acid.

EXAMPLES

The production of fine spherical particles of nickel carbonate by an emulsion process and the production of particles of nickel oxide by thermal decomposition of the fine spherical particles of nickel carbonate according to the invention are described hereunder as production examples 1 and 2. Then the invention is described in detail with reference to examples of the production of fine spherical particles of metallic nickel using the above-mentioned particles of nickel carbonate or nickel oxide. However, the invention is not limited to these production examples and examples.

In the following examples and comparative examples, the average particle size of nickel compounds used as raw materials and metallic nickel was measured by a laser diffraction particle size distribution measuring device LA-500 available from K.K. Horiba Seisakusho, and the crystallite size was measured by a Scherrer method using an X-ray diffraction apparatus RAD-II C available from Rigaku Denki K.K. The scanning electron micrographs were taken using JSM-840F available from Nippon Denshi K.K. Silicon dioxide and aluminum oxide were analyzed by an inductively coupled plasma (ICP) method.

Production Example 1

Production of Fine Spherical Particles of Nickel Carbonate 141 g of commercially available basic nickel carbonate ($NiCO_3 \cdot Ni(OH)_2 \cdot 4H_2O$, the same hereunder) and 242 g of ammonium hydrogencarbonate ($NH_4HCO_3$) were added to 15% aqueous ammonia and stirred to prepare an aqueous solution of basic nickel carbonate in ammonia-ammonium hydrogencarbonate (1.1 mol/L in terms of Ni) having a pH of 9.5.

30 g of a nonionic surfactant, polyoxyethylene sorbitan monooleate having an HLB value of 15 (RHEODOL TW-0120, available from Kao Corp.) was added to 200 g of the solution of nickel salt and stirred at a temperature of 50°

C. to dissolve the surfactant in the solution. Meanwhile, 50 g of a nonionic surfactant, sorbitan monooleate having an HLB value of 4.3 (RHEODOL SP-O10, available from Kao Corp.) were added at a temperature of 80° C. to 800 g of a non-aqueous medium, squalan (Super Squalane, available from K.K. Squatech) having a boiling point of about 280° C. to dissolve the surfactant in the non-aqueous medium.

The aqueous solution of the nickel salt in which the surfactant was dissolved was mixed with the non-aqueous medium in which the surfactant was dissolved and the resulting mixture was stirred for 5 minutes using a homomixer (available from Tokushu Kika Kogyo K.K.) at 1500 rpm. This operation was repeated twice to prepare a W/O emulsion.

Suction was applied to the emulsion under a reduced pressure of 20 to 30 mmHg at a temperature of 50° C. and volatile components mainly comprising ammonia and carbon dioxide were evaporated to precipitate basic nickel carbonate in the droplets of the solution in the emulsion. Thereafter, further suction was applied to the emulsion under a reduced pressure to evaporate volatile components mainly comprising water to dry the thus formed spherical particles of the nickel carbonate in the droplets.

The particles of the basic nickel carbonate were centrifuged, washed with hexane, methanol and water in this order, and dried at a temperature of 100° C. for 2 hours, thereby providing spherical particles of basic nickel carbonate (containing 43% by weight of nickel) having a particle size of 0.5 to 5 $\mu$m. It was confirmed by a scanning electron micrograph that the obtained particles were spherical and well dispersed. The powder of basic nickel carbonate used in the following examples and comparative examples was this powder produced in this Production Example 1.

Production Example 2

Production of Fine Spherical Particles of Nickel Oxide

The powder of the spherical particles of basic nickel carbonate was heated at a rate of 50° C./hour and fired at a temperature of 500° C. for 3 hours in an air atmosphere to thermally decompose the basic nickel carbonate, providing fine spherical particles of nickel oxide having an average particle size of 0.45 $\mu$m. It was confirmed by a scanning electron micrograph that the obtained particles were spherical and well dispersed. The nickel oxide powder used in the following examples and comparative examples was this powder produced in this Production Example 2.

Examples in Which Hydroxides or Oxides of Silicon or Aluminum Were Used as a Sintering Preventive Agent Example 1

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover the basic nickel carbonate therefrom and thus an aqueous slurry of basic nickel carbonate was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% hydrochloric acid aqueous solution was slowly added dropwise to the slurry to neutralize the sodium metasilicate so that precipitates were formed.

Solid products including the precipitates were collected by filtering from the slurry, washed, and dried at 110° C. overnight, to provide powder of basic nickel carbonate containing 5% by weight of silicon dioxide ($SiO_2$) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained particles of metallic nickel were found to have a crystallite size of 910Å and an average particle size of 0.39 $\mu$m. The scanning electron micrograph of the particles showed that they were spherical and well dispersed.

Example 2

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 893A and an average particle size of 0.45 $\mu$m. A scanning electron micrograph of the particles showed that they were spherical and well dispersed.

Example 3

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover the basic nickel carbonate therefrom and thus an aqueous slurry of basic nickel carbonate was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 10° C. overnight, to provide powder of basic nickel carbonate containing 5% by weight of aluminum oxide ($Al_2O_3$) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained particles of metallic nickel were found to have a crystallite size of 921 Å and an average particle size of 0.40 μm. A scanning electron micrograph of the particles showed that they were spherical and well dispersed.

Example 4

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 922 Å and an average particle size of 0.51 μm. A scanning electron micrograph of the particles showed that they were spherical and well dispersed.

Example 5

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

1.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 3% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 933Å and an average particle size of 0.63 μm. A scanning electron micrograph of the particles showed that they were spherical and well dispersed.

Example 6

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 10% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 905Å and an average particle size of 0.45 μm. A scanning electron micrograph of the particles showed that they were spherical and well dispersed.

Example 7

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

10.0 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 20% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 875Å and an average particle size of 0.38 μm. A scanning electron micrograph of the particles showed that they were spherical and well dispersed.

Example 8

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

3.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 3% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 929Å and an average particle size of 0.65 μm. A scanning electron micrograph of the particles showed that they were spherical and well dispersed.

Example 9

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

10.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 10% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 910Å and an average particle size of 0.35 μm. A scanning electron micrograph of the particles showed that they were spherical and well dispersed.

Example 10

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

20.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 20% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 881Å and an average particle size of 0.35 μm. A scanning electron micrograph of the particles showed that they were spherical and well dispersed.

Example 11

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 300° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 220Å and an average particle size of 0.39 μm. A scanning electron micrograph of the particles showed that they were spherical and well dispersed.

Example 12

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 500° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 337Å and an average particle size of 0.44 μm. A scanning electron micrograph of the particles showed that they were spherical and well dispersed.

Example 13

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 700° C. for five hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 508Å and an average particle size of 0.42 μm. A scanning electron micrograph of the particles showed that they were spherical and well dispersed.

Example 14

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 1000° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 938Å and an average particle size of 0.53 μm. A scanning electron micrograph of the particles showed that they were spherical and well dispersed.

Example 15

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 300° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 282Å and an average particle size of 0.36 μm. A scanning electron micrograph of the particles showed that they were spherical and well dispersed.

Example 16

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate (Al(NO$_3$)$_3$, having a concentration of 50 g/L in terms of Al$_2$O$_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide (Al$_2$O$_3$) in relation to nickel.

The powder of nickel oxide was ground with an agate mortar and was then heated at a temperature of 500° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 355Å and an average particle size of 0.38 μm. A scanning electron micrograph of the particles showed that they were spherical and well dispersed.

Example 17

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate (Al(NO$_3$)$_3$, having a concentration of 50 g/L in terms of Al$_2$O$_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide (Al$_2$O$_3$) in relation to nickel.

The powder of nickel oxide was ground with an agate mortar and was then heated at a temperature of 700° C. for five hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 621Å and an average particle size of 0.42 μm. A scanning electron micrograph of the particles showed that they were spherical and well dispersed.

Example 18

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate (Al(NO$_3$)$_3$, having a concentration of 50 g/L in terms of Al$_2$O$_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide (Al$_2$O$_3$) in relation to nickel.

The powder of nickel oxide was ground with an agate mortar and was then heated at a temperature of 1000° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 927Å and an average particle size of 0.46 μm. A scanning electron micrograph of the particles showed that they were spherical and well dispersed.

Example 19

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate Na$_2$SiO$_3$, having a concentration of 100 g/L in terms of SiO$_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide (SiO$_2$) in relation to nickel.

The powder of nickel oxide was ground with an agate mortar and was then heated at a temperature of 300° C. for ten hours in a hydrogen stream to reduce the nickel oxide, and then at a temperature of 900° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 912Å and an average particle size of 0.40 μm. A scanning electron micrograph of the particles showed that they were spherical and well dispersed.

Example 20

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate (Na$_2$SiO$_3$, having a concentration of 100 g/L in terms of SiO$_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 300° C. for ten hours in a hydrogen stream to reduce the nickel oxide, and then at a temperature of 1100° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 955Å and an average particle size of 0.37 μm. A scanning electron micrograph of the particles showed that they were spherical and well dispersed.

Example 21

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 300° C. for ten hours in a hydrogen stream to reduce the nickel oxide, and then at a temperature of 1500° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 972Å and an average particle size of 0.51 μm. A scanning electron micrograph of the particles showed that they were spherical and well dispersed.

Example 22

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 300° C. for ten hours in a hydrogen stream to reduce the nickel oxide, and then at a temperature of 900° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 923Å and an average particle size of 0.51 μm. A scanning electron micrograph of the particles showed that they were spherical and well dispersed.

Example 23

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 300° C. for ten hours in a hydrogen stream to reduce the nickel oxide, and at a temperature of 1100° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 945Å and an average particle size of 0.38 μm. A scanning electron micrograph of the particles showed that they were spherical and well dispersed.

Example 24

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 300° C. for ten hours in a hydrogen stream to reduce the nickel oxide, and then at a temperature of 1500° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 977Å and an average particle size of 0.68 μm. A scanning electron micrograph of the particles showed that they were spherical and well dispersed.

Example 25

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

Ion-exchanged water was added to 2.5 mL of aqueous solution of sodium metasilicate ($Na_2SiO_3$, having a concentration of 100 g/L in terms of $SiO_2$) to a solution of total volume of 50 ml.

While stirring and cooling the slurry with ice, the solution of sodium metasilicate and 10% aqueous solution of hydrochloric acid were slowly added dropwise simultaneously to the slurry to neutralize the sodium metasilicate so that precipitates were formed with adjusting the rate of dropwise addition of both the solutions so that the slurry had a pH of 3 to 4.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 889Å and an average particle size of 0.49 μm. A scanning electron micrograph of the particles showed that they were spherical and well dispersed.

Example 26

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. The mixture was spray-dried to provide powder of nickel oxide containing 5% by weight of silicon dioxide ($SiO_2$) in relation to nickel.

The powder of nickel oxide was ground with an agate mortar and was then heated at a temperature of 500° C. for three hours in the air and then at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 915Å and an average particle size of 0.40 μm. A scanning electron micrograph of the particles showed that they were spherical and well dispersed.

Example 27

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes.

70 g of zirconia beads having a diameter of 1 mm were added to a mixture of 0.25 g of fine powder of silica (Siloid 404 available from Fuji Silicia Kagaku K.K. ) and 20 mL of ion-exchanged water. The resultant slurry was subjected to grinding with a planetary mill at a rate of 200 rpm for 60 minutes.

The zirconia beads were separated from both the slurries and washed thoroughly to recover the nickel oxide and silica therefrom, respectively, and thus aqueous slurries of nickel oxide and silica were obtained. The slurries were then combined together.

The resulting slurry was filtered, washed, and dried overnight at a temperature of 110° C. to provide powder of nickel oxide containing 5% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 929Å and an average particle size of 0.63 μm. A scanning electron micrograph of the particles showed that they were spherical and well dispersed.

Example 28

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained. 2% aqueous ammonia was added to the slurry and stirred.

Ion-exchanged water was added to 5.0 mL of aqueous solution of aluminum nitrate ($Al(NO_3)_3$, having a concentration of 50 g/L in terms of $Al_2O_3$) to prepare a solution of aluminum nitrate having a total volume of 50 mL.

While stirring and cooling the slurry with ice, the solution of aluminum nitrate was added to the slurry slowly to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 903Å and an average particle size of 0.56 µm. A scanning electron micrograph of the particles showed that they were spherical and well dispersed.

Example 29

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

Ion-exchanged water was added to 5.0 mL of aqueous solution of aluminum nitrate ($Al(NO_3)_3$, having a concentration of 50 g/L in terms of $Al_2O_3$) to prepare a solution of aluminum nitrate having a total volume of 50 mL.

While stirring and cooling the slurry with ice, the solution of aluminum nitrate and 2% aqueous ammonia aluminum nitrate were slowly added dropwise simultaneously to the slurry of nickel oxide to neutralize the aluminum nitrate and stirred with adjusting the addition rate of both the solutions so that the slurry had a pH of 7 to 8.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 900Å and an average particle size of 0.48 µm. A scanning electron micrograph of the particles showed that they were spherical and well dispersed.

Example 30

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of aluminum nitrate ($Al(NO_3)_3$, having a concentration of 50 g/L in terms of $Al_{23}$) was added to the slurry and stirred. The resulting slurry was spray-dried to provide powder of nickel oxide containing 5% by weight of aluminum oxide ($Al_{23}$) in relation to nickel.

The powder of nickel oxide was ground with an agate mortar and was then heated at a temperature of 500° C. for three hours in the air and then at a temperature of 900° C. for three hours in a hydrogen stream to reduce the nickel oxide.

After cooling and then standing at a temperature of 50° C. in a nitrogen stream containing 5% of oxygen for one hour to stabilize the resulting metallic nickel.

The thus obtained particles of metallic nickel were found to have a crystallite size of 916Å and an average particle size of 0.36 µm. A scanning electron micrograph of the particles showed that they were spherical and well dispersed.

Example 31

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes.

70 g of zirconia beads having a diameter of 1 mm were added to a mixture of 0.25 g of fine powder of alumina (AM-27 available from Sumitomo Kagaku Kogyou K.K.) and 20 mL of ion-exchanged water. The resultant slurry was subjected to grinding with a planetary mill at a rate of 200 rpm for 60 minutes.

The zirconia beads were separated from both the slurries and washed thoroughly to recover the nickel oxide and alumina therefrom, respectively, and thus aqueous slurries of nickel oxide and alumina were obtained. The slurries were the combined together and stirred.

The resulting slurry was filtered, washed, and dried overnight at a temperature of 110° C. to provide powder of nickel oxide containing 5% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide.

After cooling and then standing at a temperature of 50° C. in a nitrogen stream containing 5% of oxygen for one hour to stabilize the resulting metallic nickel.

The thus obtained particles of metallic nickel were found to have a crystallite size of 933Å and an average particle size of 0.52 µm. A scanning electron micrograph of the particles showed that they were spherical and well dispersed.

Example 32

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.5 mL of aqueous solution of sodium metasilicate ($Na_2SiO_3$, having a concentration of 100 g/L in terms of $SiO_2$) was added to the slurry and stirred. While stirring and cooling the slurry with ice, 10% aqueous solution of hydrochloric acid was slowly added dropwise to the slurry to neutralize the sodium metasilicate so that precipitates were formed.

Solid products including the precipitates were collected by filtering from the slurry, washed, and dried at 110° C. overnight, to provide powder of nickel oxide containing 5% by weight of silicon dioxide ($SiO_2$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing silicon dioxide was ground with an agate mortar and immersed in 20% aqueous solution of sodium hydroxide, followed by stirring for 30 minutes at a temperature of 80° C. to 90° C., filtering, washing and drying. This operation was repeated twice to remove the silicon dioxide from the powder of metallic nickel. The amount of silicon dioxide removed from the powder of metallic nickel was found to be 0.28% by weight in relation to nickel.

The thus obtained particles of metallic nickel were found to have a crystallite size of 918Å and an average particle size of 0.42 μm. FIG. 1 is a scanning electron micrograph of the obtained particles of metallic nickel, showing that the particles were spherical and well dispersed.

Example 33

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing aluminum oxide was ground with an agate mortar and immersed in 10% aqueous solution of hydrochloric acid, followed by stirring for 30 minutes, filtering, washing and drying. This operation was repeated twice to remove the aluminum oxide from the powder of metallic nickel. The amount of aluminum oxide removed from the powder of metallic nickel was found to be 0.15% by weight in relation to nickel.

Figure 2:
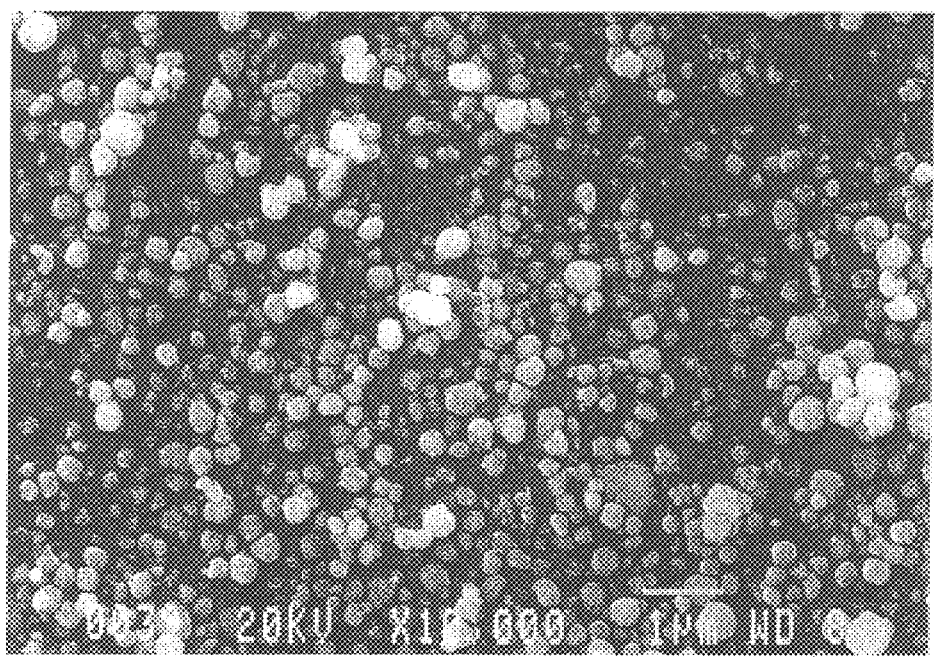
FIG. 2 is a scanning electron micrograph of particles of metallic nickel prepared in Example 33.

The thus obtained particles of metallic nickel were found to have a crystallite size of 925Å and an average particle size of 0.39 μm. FIG. 2 is a scanning electron micrograph of the obtained particles of metallic nickel, showing that the particles were spherical and well dispersed.

Example 34

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

5.0 mL of aqueous solution of aluminum nitrate ($Al(NO_3)_3$, having a concentration of 50 g/L in terms of $Al_2O_3$) was added to the slurry and stirred. While stirring and cooling the slurry with ice, 2% aqueous ammonia was slowly added dropwise to the slurry to neutralize the aluminum nitrate so that precipitates were formed.

Solid products including the precipitates were collected by filtering from the slurry, washed, and dried at 110° C. overnight, to provide powder of nickel oxide containing 5% by weight of aluminum oxide ($Al_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing aluminum oxide was ground with an agate mortar and immersed in a 20% aqueous solution of sodium hydroxide, followed by stirring at a temperature of 80–90° C. for 30 minutes, filtering, washing and drying. This operation was repeated twice to remove the aluminum oxide from the powder of metallic nickel. The amount of aluminum oxide removed from the powder of metallic nickel was found to be 0.12% by weight in relation to nickel.

Figure 3:
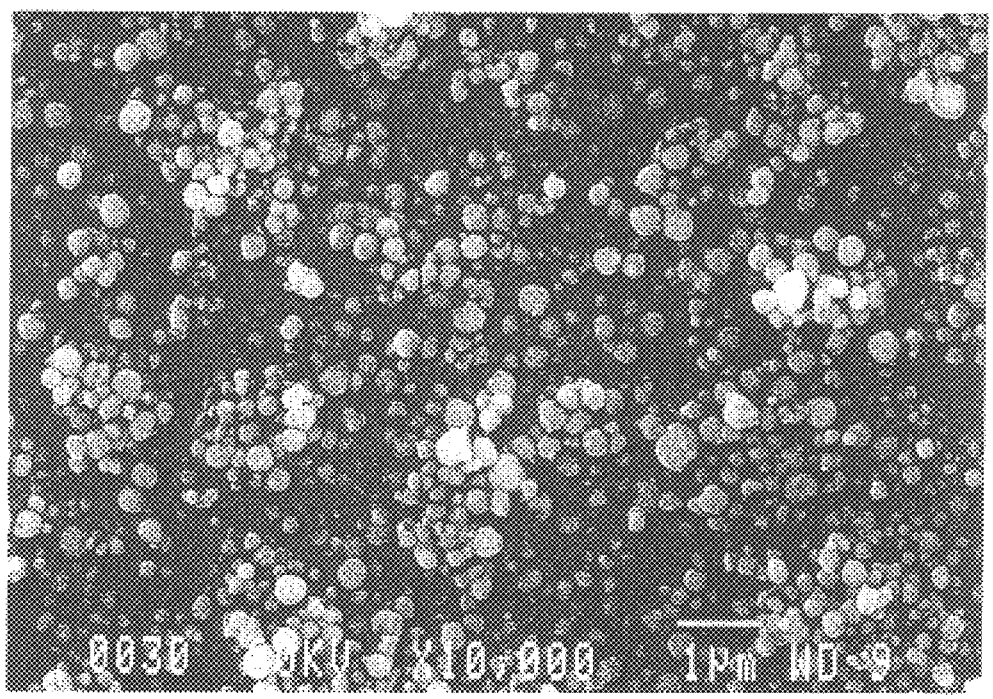
FIG. 3 is a scanning electron micrograph of particles of metallic nickel prepared in Example 34.

The thus obtained particles of metallic nickel were found to have a crystallite size of 918Å and an average particle size of 0.35 μm. FIG. 3 is a scanning electron micrograph of the obtained particles of metallic nickel, showing that the particles were spherical and well dispersed.

Examples Wherein Compounds of Rare Earth Elements Were Used as Fusion Preventive Agents Example 35

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

1.10 g of scandium nitrate tetrahydrate ($Sc(NO_3)_3 \cdot 4H_2O$) was added to the slurry and dissolved therein. While stirring and cooling the slurry with ice, 2% aqueous ammonia was slowly added dropwise to the slurry to neutralize the scandium nitrate tetrahydrate so that precipitates were formed.

Solid products including the precipitates were collected by filtering from the slurry, washed, and dried at 110° C. overnight, to provide powder of nickel oxide containing 5% by weight of scandium oxide ($Sc_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 895Å and an average particle size of 0.48 μm. A scanning electron micrograph of the particles showed that they were spherical and well dispersed.

Example 36

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

Figure 4:
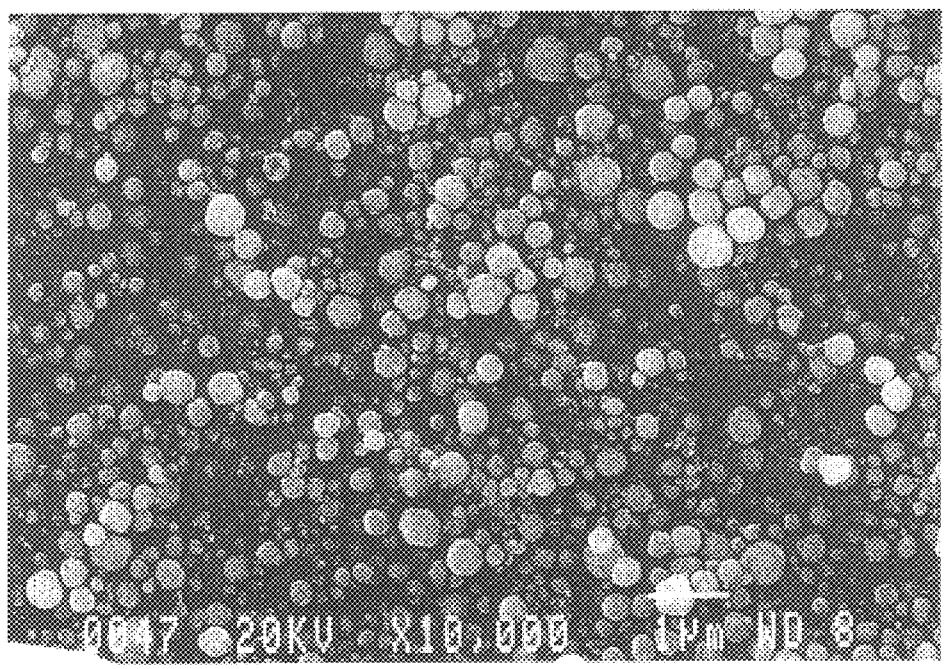
FIG. 4 is a scanning electron micrograph of particles of metallic nickel prepared in Example 36.

The thus obtained particles of metallic nickel were found to have a crystallite size of 911Å and an average particle size of 0.42 µm. FIG. 4 is a scanning electron micrograph of the obtained particles of metallic nickel, showing that the particles were spherical and well dispersed.

Example 37

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.66 g of lanthanum nitrate ($La(NO_3)_3 \cdot 6H_2O$) was added to the slurry and dissolved therein. While stirring and cooling the slurry with ice, 2% aqueous ammonia was slowly added dropwise to the slurry to neutralize the lanthanum nitrate so that precipitates were formed.

Solid products including the precipitates were collected by filtering from the slurry, washed, and dried at 110° C. overnight, to provide powder of nickel oxide containing 5% by weight of lanthanum oxide ($La_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 917Å and an average particle size of 0.72 µm. The scanning electron micrograph of the particles showed that they were spherical and well dispersed.

Example 38

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.66 g of cerium nitrate hexahydrate ($Ce(NO_3)_3 \cdot 6H_2O$) was added to the slurry and dissolved therein. While stirring and cooling the slurry with ice, 2% aqueous ammonia was slowly added dropwise to the slurry to neutralize the cerium nitrate so that precipitates were formed.

Solid products including the precipitates were collected by filtering from the slurry, washed, and dried at 110° C. overnight, to provide powder of nickel oxide containing 5% by weight of cerium oxide ($Ce_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 886Å and an average particle size of 0.62 µm. The scanning electron micrograph of the particles showed that they were spherical and well dispersed.

Example 39

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.66 g of praseodymium nitrate hexahydrate ($Pr(NO_3)_3 \cdot 6H_2O$) was added to the slurry and dissolved therein. While stirring and cooling the slurry with ice, 2% aqueous ammonia was slowly added dropwise to the slurry to neutralize the praseodymium nitrate so that precipitates were formed.

Solid products including the precipitates were collected by filtering from the slurry, washed, and dried at 110° C. overnight, to provide powder of nickel oxide containing 5% by weight of praseodymium oxide ($Pr_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 935 Å and an average particle size of 0.58 µm. The scanning electron micrograph of the particles showed that they were spherical and well dispersed.

Example 40

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.65 g of neodymium nitrate hexahydrate ($Nd(NO_3)_3 \cdot 6H_2O$) was added to the slurry and dissolved therein. While stirring and cooling the slurry with ice, 2% aqueous ammonia was slowly added dropwise to the slurry to neutralize the neodymium nitrate so that precipitates were formed.

Solid products including the precipitates were collected by filtering from the slurry, washed, and dried at 110° C. overnight, to provide powder of nickel oxide containing 5% by weight of cerium oxide ($Nd_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 899 Å and an average particle size of 0.60 µm. The scanning electron micrograph of the particles showed that they were spherical and well dispersed.

Example 41

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.64 g of samarium nitrate hexahydrate ($Sm(NO_3)_3 \cdot 6H_2O$) was added to the slurry and dissolved therein. While stirring and cooling the slurry with ice, 2% aqueous ammonia was slowly added dropwise to the slurry to neutralize the samarium nitrate so that precipitates were formed.

Solid products including the precipitates were collected by filtering from the slurry, washed, and dried at 110° C. overnight, to provide powder of nickel oxide containing 5% by weight of europium oxide ($Sm_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 910 Å and an average particle size of 0.56 µm. The scanning electron micrograph of the particles showed that they were spherical and well dispersed.

Example 42

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.63 g of europium nitrate hexahydrate ($Eu(NO_3)_3 \cdot 6H_2O$) was added to the slurry and dissolved therein. While stirring and cooling the slurry with ice, 2% aqueous ammonia was slowly added dropwise to the slurry to neutralize the europium nitrate so that precipitates were formed.

Solid products including the precipitates were collected by filtering from the slurry, washed, and dried at 110° C. overnight, to provide powder of nickel oxide containing 5% by weight of europium oxide ($Eu_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 899 Å and an average particle size of 0.59 µm. The scanning electron micrograph of the particles showed that they were spherical and well dispersed.

Example 43

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.62 g of gadolinium nitrate hexahydrate ($Ga(NO_3)_3 \cdot 6H_2O$) was added to the slurry and dissolved therein. While stirring and cooling the slurry with ice, 2% aqueous ammonia was slowly added dropwise to the slurry to neutralize the gadolinium nitrate so that precipitates were formed.

Solid products including the precipitates were collected by filtering from the slurry, washed, and dried at 110° C. overnight, to provide powder of nickel oxide containing 5% by weight of gadolinium oxide ($Ga_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

Figure 5:
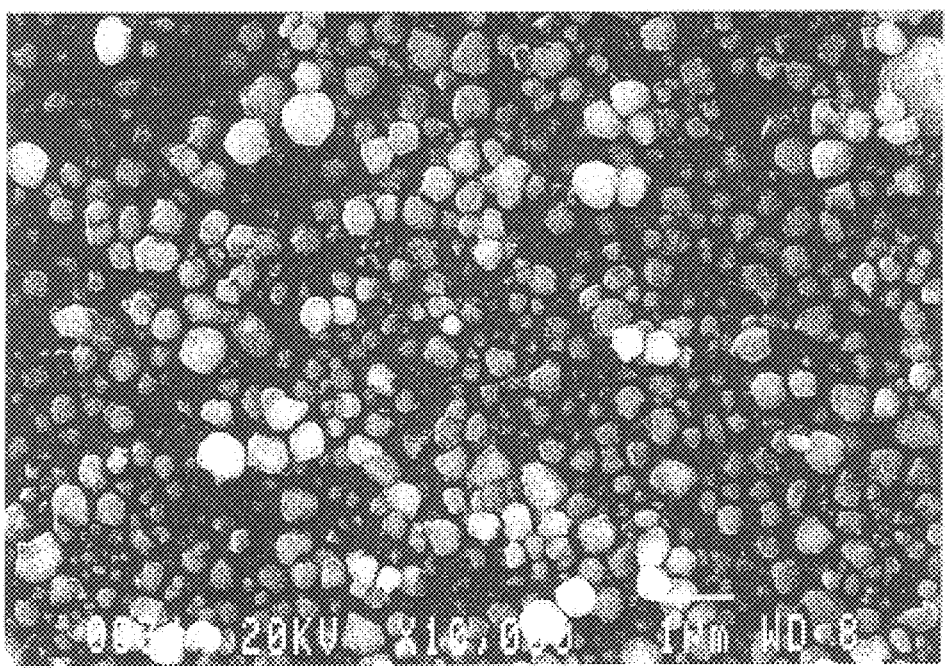
FIG. 5 is a scanning electron micrograph of particles of metallic nickel prepared in Example 43.

The thus obtained particles of metallic nickel were found to have a crystallite size of 915 Å and an average particle size of 0.52 µm. FIG. 5 is a scanning electron micrograph of the obtained particles of metallic nickel, showing that the particles were spherical and well dispersed.

Example 44

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.62 g of terbium nitrate hexahydrate ($Tb(NO_3)_3 \cdot 6H_2O$) was added to the slurry and dissolved therein. While stirring and cooling the slurry with ice, 2% aqueous ammonia was slowly added dropwise to the slurry to neutralize the terbium nitrate so that precipitates were formed.

Solid products including the precipitates were collected by filtering from the slurry, washed, and dried at 110° C. overnight, to provide powder of nickel oxide containing 5% by weight of terbium oxide ($Tb_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 908 Å and an average particle size of 0.53 µm. The scanning electron micrograph of the particles showed that they were spherical and well dispersed.

Example 45

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.61 g of dysprosium nitrate hexahydrate (Dy(NO$_3$)$_3$·6H$_2$O) was added to the slurry and dissolved therein. While stirring and cooling the slurry with ice, 2% aqueous ammonia was slowly added dropwise to the slurry to neutralize the dysprosium nitrate so that precipitates were formed.

Solid products including the precipitates were collected by filtering from the slurry, washed, and dried at 110° C. overnight, to provide powder of nickel oxide containing 5% by weight of dysprosium oxide (Dy$_2$O$_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 889 Å and an average particle size of 0.49 μm. The scanning electron micrograph of the particles showed that they were spherical and well dispersed.

Example 46

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.50 g of holmium chloride hexahydrate (HoCl$_3$·6H$_2$O) was added to the slurry and dissolved therein. While stirring and cooling the slurry with ice, 2% aqueous ammonia was slowly added dropwise to the slurry to neutralize the holmium chloride so that precipitates were formed.

Solid products including the precipitates were collected by filtering from the slurry, washed, and dried at 110° C. overnight, to provide powder of nickel oxide containing 5% by weight of holmium oxide (Ho$_2$O$_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 903 Å and an average particle size of 0.55 μm. The scanning electron micrograph of the particles showed that they were spherical and well dispersed.

Example 47

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.60 g of erbium nitrate hexahydrate (Er(NO$_3$)$_3$·6H$_2$O) was added to the slurry and dissolved therein. While stirring and cooling the slurry with ice, 2% aqueous ammonia was slowly added dropwise to the slurry to neutralize the erbium nitrate so that precipitates were formed.

Solid products including the precipitates were collected by filtering from the slurry, washed, and dried at 110° C. overnight, to provide powder of nickel oxide containing 5% by weight of erbium oxide (Er$_2$O$_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 888 Å and an average particle size of 0.55 μm. The scanning electron micrograph of the particles showed that they were spherical and well dispersed.

Example 48

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.55 g of thulium nitrate tetahydrate (Tm(NO$_3$)$_3$·4H$_2$O) was added to the slurry and dissolved therein. While stirring and cooling the slurry with ice, 2% aqueous ammonia was slowly added dropwise to the slurry to neutralize the thulium nitrate so that precipitates were formed.

Solid products including the precipitates were collected by filtering from the slurry, washed, and dried at 110° C. overnight, to provide powder of nickel oxide containing 5% by weight of thulium oxide (Tm$_2$O$_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 922 Å and an average particle size of 0.63 μm. The scanning electron micrograph of the particles showed that they were spherical and well dispersed.

Example 49

6.4 g of power of spherical particles of nickel oxide was dispersed in 20 mL of ion-exchanged water and, 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.55 g of ytterbium nitrate tetahydrate (Yb(NO$_3$)$_3$·4H$_2$O) was added to the slurry and dissolved therein. While stirring and cooling the slurry with ice, 2% aqueous ammonia was slowly added dropwise to the slurry to neutralize the ytterbium nitrate so that precipitates were formed.

Solid products including the precipitates were collected by filtering from the slurry, washed, and dried at 110° C. overnight, to provide powder of nickel oxide containing 5% by weight of ytterbium oxide (Yb$_2$O$_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 879 Å and an average particle size of 0.66 μm. The scanning electron micrograph of the particles showed that they were spherical and well dispersed.

Example 50

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained. 0.50 g of lutetium nitrate dihydrate ($Lu(NO_3)_3 \cdot 2H_2O$) was added to the slurry and dissolved therein. While stirring and cooling the slurry with ice, 2% aqueous ammonia was slowly added dropwise to the slurry to neutralize the nickel so that precipitates were formed.

Solid products including the precipitates were collected by filtering from the slurry, washed, and dried at 110° C. overnight, to provide powder of nickel oxide containing 5% by weight of lutetium oxide ($Lu_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

Figure 6:
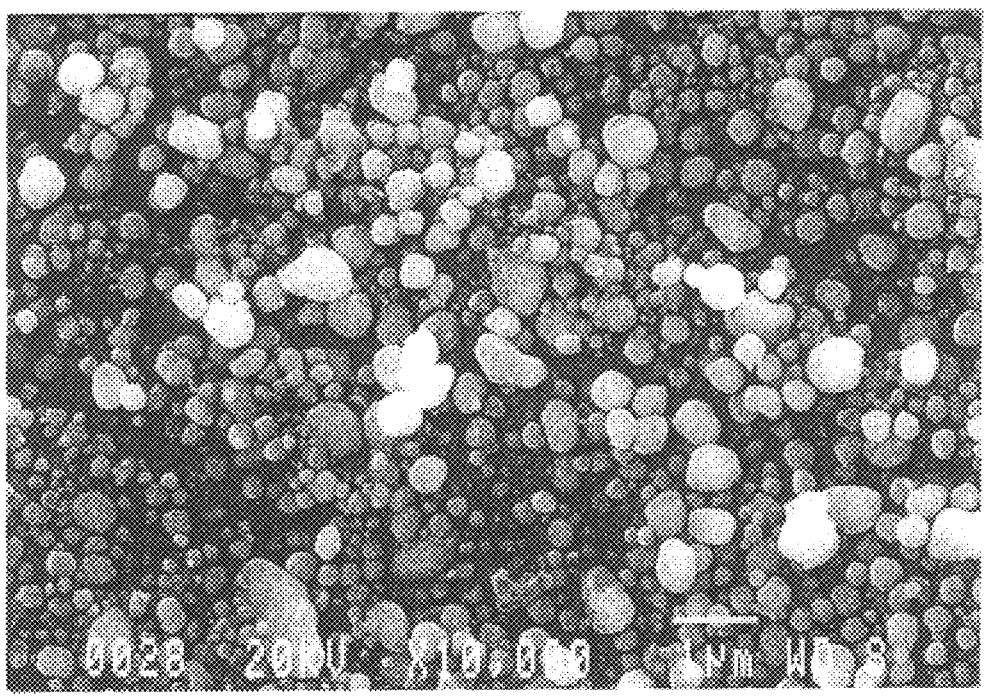
FIG. 6 is a scanning electron micrograph of particles of metallic nickel prepared in Example 50.
Figure 7:
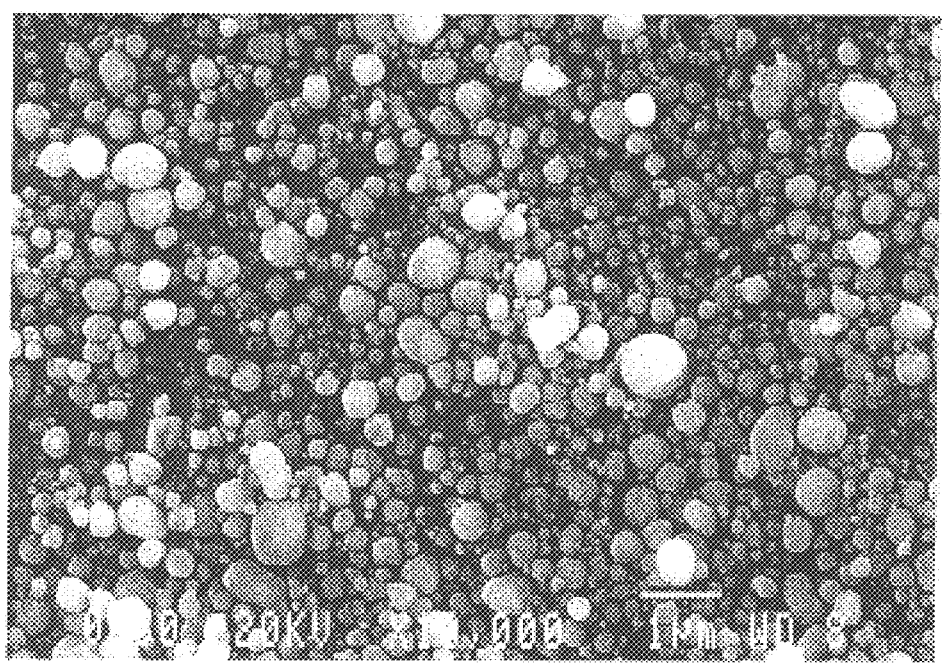
FIG. 7 is a scanning electron micrograph of particles of metallic nickel prepared in Example 53.

The thus obtained particles of metallic nickel were found to have a crystallite size of 900 Å and an average particle size of 0.58 μm. FIG. 6 is a scanning electron micrograph of the obtained particles of metallic nickel, showing that the particles were spherical and well dispersed.

Example 51

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover basic nickel carbonate therefrom and thus an aqueous slurry of basic nickel carbonate was obtained.

0.65 g of neodymium nitrate hexahydrate ($Nd(NO_3)_3 \cdot 6H_2O$) was added to the slurry and stirred to dissolve therein. While stirring and cooling the slurry with ice, 2% aqueous ammonia was slowly added dropwise to the slurry to neutralize the neodymium nitrate so that precipitates were formed.

Solid products including the precipitates were collected by filtering from the slurry, washed, and dried at 110° C. overnight, to provide powder of basic nickel carbonate containing 5% by weight of neodymium oxide ($Nd_2O_3$) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained particles of metallic nickel were found to have a crystallite size of 822 Å and an average particle size of 0.53 μm. The scanning electron micrograph of the particles showed that they were spherical and well dispersed.

Example 52

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover basic nickel carbonate therefrom and thus an aqueous slurry of basic nickel carbonate was obtained.

0.62 g of gadolinium nitrate hexahydrate ($Gd(NO_3)_3 \cdot 6H_2O$) was added to the slurry and stirred to dissolve therein. While stirring and cooling the slurry with ice, 2% aqueous ammonia was slowly added dropwise to the slurry to neutralize the gadolinium nitrate so that precipitates were formed.

Solid products including the precipitates were collected by filtering from the slurry, washed, and dried at 110° C. overnight, to provide powder of basic nickel carbonate containing 5% by weight of gadolinium oxide ($Gd_2O_3$) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained particles of metallic nickel were found to have a crystallite size of 911A and an average particle size of 0.63 μm. The scanning electron micrograph of the particles showed that they were spherical and well dispersed.

Example 53

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover basic nickel carbonate therefrom and thus an aqueous slurry of basic nickel carbonate was obtained.

0.50 g of ytterbium nitrate tetrahydrate ($Yb(NO_3)_3 \cdot 4H_2O$) was added to the slurry and stirred to dissolve therein. While stirring and cooling the slurry with ice, 2% aqueous ammonia was slowly added dropwise to the slurry to neutralize the ytterbium nitrate so that precipitates were formed.

Solid products including the precipitates were collected by filtering from the slurry, washed, and dried at 110° C. overnight, to provide powder of basic nickel carbonate containing 5% by weight of ytterbium oxide ($Yb_2O_3$) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained particles of metallic nickel were found to have a crystallite size of 890 Å and an average particle size of 0.59 μm. The scanning electron micrograph of the particles showed that they were spherical and well dispersed.

Example 54

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.51 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 3% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 916 Å and an average particle size of 0.63 μm. The scanning electron micrograph of the particles showed that they were spherical and well dispersed.

Example 55

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

1.70 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 10% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 890 Å and an average particle size of 0.38 μm. The scanning electron micrograph of the particles showed that they were spherical and well dispersed.

Example 56

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

3.40 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 20% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 900 Å and an average particle size of 0.38 μm. The scanning electron micrograph of the particles showed that they were spherical and well dispersed.

Example 57

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.37 g of gadolinium nitrate hexahydrate ($Gd(NO_3)_3 \cdot 6H_2O$) was added to the slurry and dissolved therein. While stirring and cooling the slurry with ice, 2% aqueous ammonia was slowly added dropwise to the slurry to neutralize the gadolinium nitrate so that precipitates were formed.

Solid products including the precipitates were collected by filtering from the slurry, washed, and dried at 110° C. overnight, to provide powder of nickel oxide containing 3% by weight of gadolinium oxide ($Gd_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 899 Å and an average particle size of 0.66 μm. The scanning electron micrograph of the particles showed that they were spherical and well dispersed.

Example 58

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

1.24 g of gadolinium nitrate hexahydrate ($Gd(NO_3)_3 \cdot 6H_2O$) was added to the slurry and dissolved therein. While stirring and cooling the slurry with ice, 2% aqueous ammonia was slowly added dropwise to the slurry to neutralize the gadolinium nitrate so that precipitates were formed.

Solid products including the precipitates were collected by filtering from the slurry, washed, and dried at 110° C. overnight, to provide powder of nickel oxide containing 10% by weight of gadolinium oxide ($Gd_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 921 Å and an average particle size of 0.41 µm. The scanning electron micrograph of the particles showed that they were spherical and well dispersed.

Example 59

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

2.48 g of gadolinium nitrate hexahydrate ($Gd(NO_3)_3 \cdot 6H_2O$) was added to the slurry and dissolved therein. While stirring and cooling the slurry with ice, 2% aqueous ammonia was slowly added dropwise to the slurry to neutralize the gadolinium nitrate so that precipitates were formed.

Solid products including the precipitates were collected by filtering from the slurry, washed, and dried at 110° C. overnight, to provide powder of nickel oxide containing 20% by weight of gadolinium oxide ($Gd_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 907 Å and an average particle size of 0.35 µm. The scanning electron micrograph of the particles showed that they were spherical and well dispersed.

Example 60

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 300° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 288 Å and an average particle size of 0.38 µm. The scanning electron micrograph of the particles showed that they were spherical and well dispersed.

Example 61

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 500° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 367 Å and an average particle size of 0.35 µm. The scanning electron micrograph of the particles showed that they were spherical and well dispersed.

Example 62

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 700° C. for five hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 572 Å and an average particle size of 0.41 µm. The scanning electron micrograph of the particles showed that they were spherical and well dispersed.

Example 63

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 1000° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 955 Å and an average particle size of 0.45 μm. The scanning electron micrograph of the particles showed that they were spherical and well dispersed.

Example 64

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 300° C. for ten hours in a hydrogen stream to reduce the nickel oxide and then at a temperature of 700° C. for five hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 773 Å and an average particle size of 0.40 μm. The scanning electron micrograph of the particles showed that they were spherical and well dispersed.

Example 65

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 300° C. for ten hours in a hydrogen stream to reduce the nickel oxide and then at a temperature of 900° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 913 Å and an average particle size of 0.40 μm. The scanning electron micrograph of the particles showed that they were spherical and well dispersed.

Example 66

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 300° C. for ten hours in a hydrogen stream to reduce the nickel oxide and then at a temperature of 1100° C. for three hours in a nitrogen stream After cooling and then standing at a temperature of 50° C. in a nitrogen stream containing 5% of oxygen for one hour to stabilize the resulting metallic nickel.

The thus obtained particles of metallic nickel were found to have a crystallite size of 977 Å and an average particle size of 0.43 μm. The scanning electron micrograph of the particles showed that they were spherical and well dispersed.

Example 67

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 300° C. for ten hours in a hydrogen stream to reduce the nickel oxide and then at a temperature of 1500° C. for three hours in a nitrogen stream. After cooling and then standing at a temperature of 50° C. in a nitrogen stream containing 5% of oxygen for one hour to stabilize the resulting metallic nickel.

The thus obtained particles of metallic nickel were found to have a crystallite size of 933 Å and an average particle size of 0.48 μm. The scanning electron micrograph of the particles showed that they were spherical and well dispersed.

Example 68

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

3.50 g of ammonium hydrogencarbonate ($NH_4HCO_3$) was added to the slurry and stirred to dissolve the carbonate therein. While stirring and cooling the slurry with ice, an aqueous solution of 0.85 g of yttrium nitrate hexahydrate ($Y(NO_3)_3.6H_2O$) in 25 mL of ion-exchanged water was added slowly to the slurry so that the yttrium nitrate was neutralized and precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 898 Å and an average particle size of 0.51 μm. The scanning electron micrograph of the particles showed that they were spherical and well dispersed.

Example 69

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

While stirring and cooling the slurry with ice, an aqueous solution of 0.85 g of yttrium nitrate hexahydrate ($Y(NO_3)_3.6H_2O$) in 25 mL of ion-exchanged water and 2% aqueous ammonia were added to the slurry simultaneously so that the yttrium nitrate was neutralized and precipitates were formed with adjusting the addition rate of both the solutions so that the slurry had a pH of 7 to 8.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained particles of metallic nickel were found to have a crystallite size of 915 Å and an average particle size of 0.39 μm. The scanning electron micrograph of the particles showed that they were spherical and well dispersed.

Example 70

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3.6H_2O$) was added to the slurry and dissolved therein. The slurry was then spray dried to provide powder of nickel oxide containing 5% by weight of yttrium oxide ($Y_2O_3$) in relation to nickel.

The powder of nickel oxide was ground with an agate mortar and was then heated at a temperature of 500° C. for three hours in the air and then at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

Figure 8:
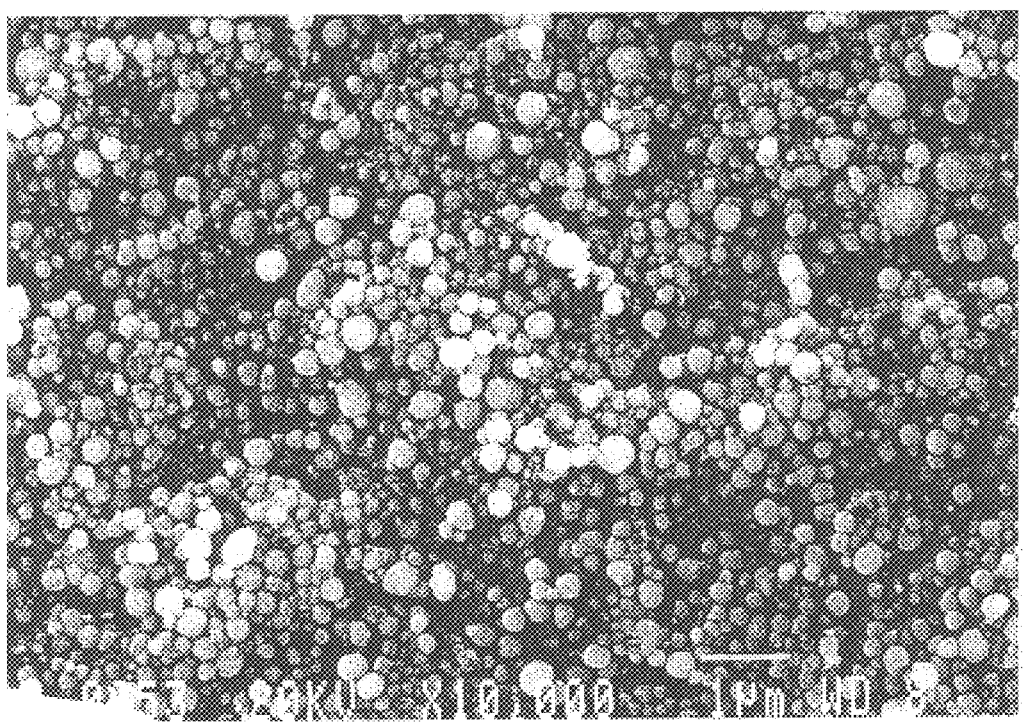
FIG. 8 is a scanning electron micrograph of particles of metallic nickel prepared in Example 70.

The thus obtained particles of metallic nickel were found to have a crystallite size of 922 Å and an average particle size of 0.35 μm. FIG. 8 is a scanning electron micrograph of the obtained particles, showing that they were spherical and well dispersed.

Example 71

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes.

70 g of zirconia beads having a diameter of 1 mm were added to a dispersion of 0.25 g of yttrium oxide ($Y_2O_3$) in 20 mL of ion-exchanged water and the mixture was ground with a planetary mill at a rate of 200 rpm for 10 minutes in the same manner as above.

The zirconia beads were separated from both the slurries and washed thoroughly to recover the nickel oxide and yttrium oxide therefrom, respectively, and then the slurries were combined together and stirred thoroughly.

The resulting slurry was dried overnight at a temperature of 110° C. to provide powder of nickel oxide containing 5% by weight of yttrium oxide in relation to nickel. The powder of nickel oxide was ground with an agate mortar and was then heated at a temperature of 900° C. for three hours in a hydrogen stream to reduce the nickel. After cooling and then standing at a temperature of 50° C. in a nitrogen stream containing 5% of oxygen for one hour to stabilize the resulting metallic nickel.

The thus obtained particles of metallic nickel were found to have a crystallite size of 907 Å and an average particle size of 0.43 μm. A scanning electron micrograph of the particles showed that they were spherical and well dispersed.

Example 72

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.85 g of yttrium nitrate hexahydrate ($Y(NO_3)_3 \cdot 6H_2O$) was added to the slurry and dissolved therein. While stirring and cooling the slurry with ice, 2% aqueous ammonia was slowly added dropwise to the slurry to neutralize the yttrium nitrate so that precipitates were formed.

Solid products including the precipitates were collected by filtering from the slurry, washed, and dried at 110° C. overnight, to provide powder of nickel oxide containing 5% by weight of yttrium oxide ($Y_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing yttrium oxide was ground with an agate mortar and immersed in 10% aqueous solution of hydrochloric acid, followed by stirring for 30 minutes, filtering, washing and drying. This operation was repeated twice to remove the yttrium oxide from the powder of metallic nickel. The amount of yttrium oxide removed from the powder of metallic nickel was found to be 0.11% by weight in relation to nickel.

The thus obtained particles of metallic nickel were found to have a crystallite size of 913 Å and an average particle size of 0.45 μm. The scanning electron micrograph of the particles showed that they were spherical and well dispersed.

Example 73

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.66 g of praseodymium nitrate hexahydrate ($Pr(NO_3)_3 \cdot 6H_2O$) was added to the slurry and dissolved therein. While stirring and cooling the slurry with ice, 2% aqueous ammonia was slowly added dropwise to the slurry to neutralize the praseodymium nitrate so that precipitates were formed.

Solid products including the precipitates were collected by filtering from the slurry, washed, and dried at 110° C. overnight, to provide powder of nickel oxide containing 5% by weight of praseodymium oxide ($Pr_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing praseodymium oxide was ground with an agate mortar and immersed in 10% aqueous solution of hydrochloric acid, followed by stirring for 30 minutes, filtering, washing and drying. This operation was repeated twice to remove the praseodymium oxide from the powder of metallic nickel. The amount of praseodymium oxide removed from the powder of metallic nickel was found to be 0.18% by weight in relation to nickel.

The thus obtained particles of metallic nickel were found to have a crystallite size of 928 Å and an average particle size of 0.42 μm. The scanning electron micrograph of the particles showed that they were spherical and well dispersed.

Example 74

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.62 g of terbium nitrate hexahydrate ($Tb(NO_3)_3 \cdot 6H_2O$) was added to the slurry and dissolved therein. While stirring and cooling the slurry with ice, 2% aqueous ammonia was slowly added dropwise to the slurry to neutralize the terbium nitrate so that precipitates were formed.

Solid products including the precipitates were collected by filtering from the slurry, washed, and dried at 110° C. overnight, to provide powder of nickel oxide containing 5% by weight of terbium oxide ($Tb_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing terbium oxide was ground with an agate mortar and immersed in 10% aqueous solution of hydrochloric acid, followed by stirring for 30 minutes, filtering, washing and drying. This operation was repeated twice to remove the terbium oxide from the powder of metallic nickel. The amount of terbium oxide removed from the powder of metallic nickel was found to be 0.28% by weight in relation to nickel.

The thus obtained particles of metallic nickel were found to have a crystallite size of 899 Å and an average particle size of 0.47 μm. The scanning electron micrograph of the particles showed that they were spherical and well dispersed.

Example 75

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

0.62 g of erbium nitrate hexahydrate ($Er(NO_3)_3 \cdot 6H_2O$) was added to the slurry and dissolved therein. While stirring and cooling the slurry with ice, 2% aqueous ammonia was slowly added dropwise to the slurry to neutralize the erbium nitrate so that precipitates were formed.

Solid products including the precipitates were collected by filtering from the slurry, washed, and dried at 110° C. overnight, to provide powder of nickel oxide containing 5% by weight of erbium oxide ($Er_2O_3$) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing erbium oxide was ground with an agate mortar and immersed in 10% aqueous solution of hydrochloric acid, followed by stirring for 30 minutes, filtering, washing and drying. This operation was repeated twice to remove the erbium oxide from the powder of metallic nickel. The amount of terbium oxide removed from the powder of metallic nickel was found to be 0.35% by weight in relation to nickel.

The thus obtained particles of metallic nickel were found to have a crystallite size of 927 Å and an average particle size of 0.58 μm. The scanning electron micrograph of the particles showed that they were spherical and well dispersed.

Examples Wherein Calcium or Magnesium Compounds are Used as Fusion Preventive Agents Example 76

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the of magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel. The amount of magnesium oxide removed from the powder of metallic nickel was found to be 0.11% by weight in relation to nickel.

Figure 9:
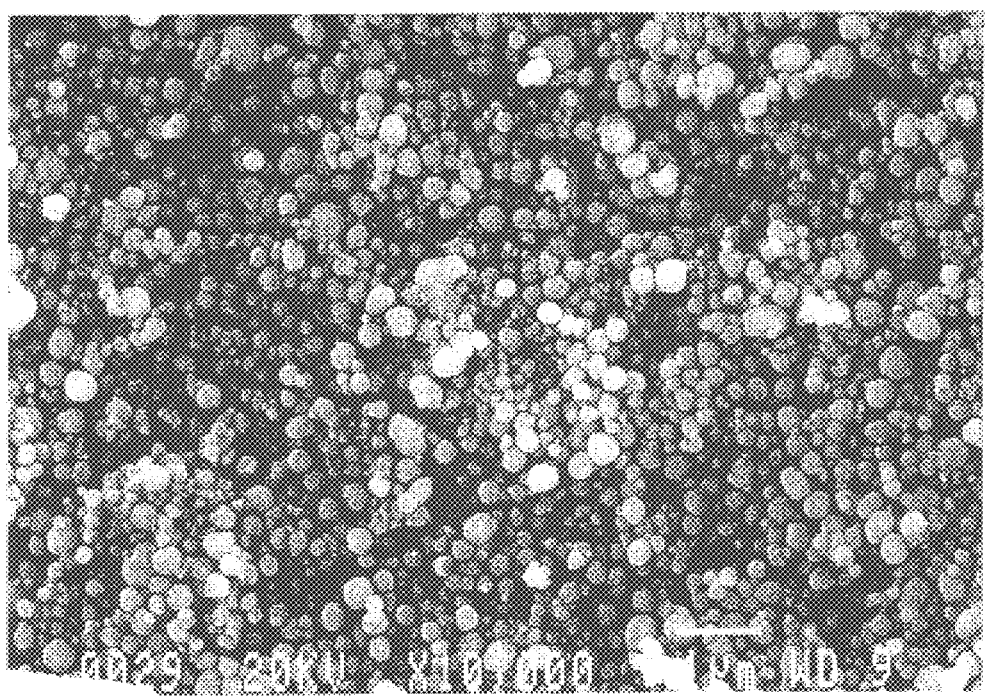
FIG. 9 is a scanning electron micrograph of particles of metallic nickel prepared in Example 76.

The thus obtained particles of metallic nickel were found to have a crystallite size of 912 Å and an average particle size of 0.36 μm. FIG. 9 is a scanning electron micrograph of the obtained particles and showed that they were spherical and well dispersed.

Example 77

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of calcium nitrate tetrahydrate ($Ca(NO_3)_2 \cdot 4H_2O$) was added to the slurry and dissolved therein. While stirring and cooling the slurry with ice, 2% aqueous ammonia was slowly added dropwise to the slurry to neutralize the calcium nitrate so that precipitates were formed.

Solid products including the precipitates were collected by filtering from the slurry, washed, and dried at 110° C. overnight, to provide powder of nickel oxide containing 20% by weight of calcium oxide (CaO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing calcium oxide was ground with an agate mortar and immersed in 10% aqueous solution of acetic acid, followed by stirring for 30 minutes, filtering, washing and drying. This operation was repeated twice to remove the calcium oxide from the powder of metallic nickel. The amount of calcium oxide removed from the powder of metallic nickel was found to be 0.08% by weight in relation to nickel.

Figure 10:
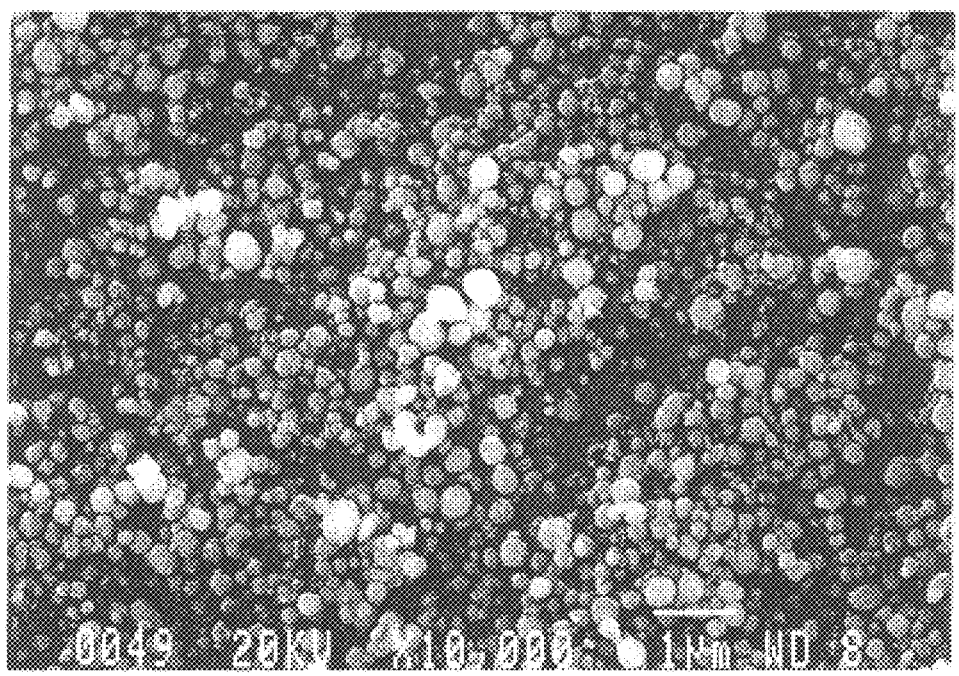
FIG. 10 is a scanning electron micrograph of particles of metallic nickel prepared in Example 77.

The thus obtained particles of metallic nickel were found to have a crystallite size of 934 Å and an average particle size of 0.41 μm. FIG. 10 is a scanning electron micrograph of the obtained particles and showed that they were spherical and well dispersed.

Example 78

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

1.60 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 5% by weight of magnesium oxide (MgO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 996 Å and an average particle size of 0.78 μm. The scanning electron micrograph of the particles showed that they were spherical and well dispersed.

Example 79

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

3.20 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 10% by weight of magnesium oxide (MgO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 967 Å and an average particle size of 0.62 μm. The scanning electron micrograph of the particles showed that they were spherical and well dispersed.

Example 80

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 300° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 230 Å and an average particle size of 0.46 μm. The scanning electron micrograph of the particles showed that they were spherical and well dispersed.

Example 81

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 500° C. for ten hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 384 Å and an average particle size of 0.49 μm. The scanning electron micrograph of the particles showed that they were spherical and well dispersed.

Example 82

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 700° C. for five hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 495 Å and an average particle size of 0.48 μm. The scanning electron micrograph of the particles showed that they were spherical and well dispersed.

Example 83

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 300° C. for ten hours in a hydrogen stream to reduce the nickel oxide and then at a temperature of 700° C. for five hours in a nitrogen stream After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 637 Å and an average particle size of 0.53 μm. The scanning electron micrograph of the particles showed that they were spherical and well dispersed.

Example 84

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 300° C. for ten hours in a hydrogen stream to reduce the nickel oxide and then at a temperature of 900° C. for three hours in a nitrogen stream. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 936 Å and an average particle size of 0.47 μm. The scanning electron micrograph of the particles showed that they were spherical and well dispersed.

Example 85

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 300° C. for ten hours in a hydrogen stream to reduce the nickel oxide and then at a temperature of 1100° C. for three hours in a nitrogen stream. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 984 Å and an average particle size of 0.66 μm. The scanning electron micrograph of the particles showed that they were spherical and well dispersed.

Example 86

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover basic nickel carbonate therefrom and thus an aqueous slurry of basic nickel carbonate was obtained.

6.39 g of magnesium nitrate hexahydrate ($Mg(NO_3)_2 \cdot 6H_2O$) was added to the slurry and dissolved therein. While stirring and cooling the slurry with ice, 2% aqueous ammonia was slowly added dropwise to the slurry to neutralize the magnesium nitrate so that precipitates were formed.

Solid products including the precipitates were collected by filtering from the slurry, washed, and dried at 110° C. overnight, to provide powder of basic nickel carbonate containing 20% by weight of magnesium oxide (MgO) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 921 Å and an average particle size of 0.41 μm. The scanning electron micrograph of the particles showed that they were spherical and well dispersed.

Example 87

11.6 g of power of spherical particles of basic nickel carbonate was dispersed in 20 mL of ion-exchanged water and 70 g of zirconia beads having a diameter of 1 mm were added. The resultant slurry was subjected to grinding with a planetary mill at a rate of 100 rpm for 10 minutes. The zirconia beads were separated from the slurry and washed thoroughly to recover basic nickel carbonate therefrom and thus an aqueous slurry of basic nickel carbonate was obtained.

6.39 g of calcium nitrate tetrahydrate ($Ca(NO_3)_2 \cdot 4H_2O$) was added to the slurry and dissolved therein. While stirring and cooling the slurry with ice, 2% aqueous ammonia was slowly added dropwise to the slurry to neutralize the calcium nitrate so that precipitates were formed.

Solid products including the precipitates were collected by filtering from the slurry, washed, and dried at 110° C. overnight, to provide powder of basic nickel carbonate containing 20% by weight of calcium oxide (CaO) in relation to nickel.

The powder of basic nickel carbonate was ground with an agate mortar and was then heated at a temperature of 900° C. for three hours in a hydrogen stream to reduce the basic nickel carbonate. After cooling and then standing at a temperature of 50° C. in a nitrogen stream containing 5% of oxygen for one hour to stabilize the resulting metallic nickel.

The thus obtained powder of metallic nickel containing calcium oxide was ground with an agate mortar and immersed in 10% aqueous solution of acetic acid, followed by stirring for 30 minutes, filtering, washing and drying. This operation was repeated twice to remove the calcium oxide from the powder of metallic nickel.

The thus obtained particles of metallic nickel were found to have a crystallite size of 944 Å and an average particle size of 0.40 μm. The scanning electron micrograph of the particles showed that they were spherical and well dispersed.

Example 88

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

While stirring and cooling the slurry with ice, an aqueous solution of 6.39 g of magnesium nitrate hexahydrate ($Mg(NO_3)_3 \cdot 6H_2O$) in 25 mL of ion-exchanged water and 2% aqueous ammonia were added to the slurry simultaneously so that the magnesium nitrate was neutralized and precipitates were formed with adjusting the addition rate of both the solutions so that the slurry had a pH of 11 to 12.

Solid products including the precipitates were collected by filtering from the slurry, washed, and dried at 110° C. overnight, to provide powder of nickel oxide containing 20% by weight of magnesium oxide (MgO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 884 Å and an average particle size of 0.39 μm. The scanning electron micrograph of the particles showed that they were spherical and well dispersed.

Example 89

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained. 2% aqueous ammonia were added to the slurry and stirred.

While stirring and cooling the slurry with ice, an aqueous solution of 6.39 g of magnesium nitrate hexahydrate ($Mg(NO_3)_3 \cdot 6H_2O$) in 25 mL of ion-exchanged water was added slowly to the slurry so that the magnesium nitrate was neutralized to form precipitates.

Solid products including the precipitates were collected by filtering from the slurry, washed, and dried at 110° C.

overnight, to provide powder of nickel oxide containing 20% by weight of magnesium oxide (MgO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 897 Å and an average particle size of 0.44 μm. The scanning electron micrograph of the particles showed that they were spherical and well dispersed.

Example 90

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes. The zirconia beads were separated from the slurry and washed thoroughly to recover the nickel oxide therefrom and thus an aqueous slurry of nickel oxide was obtained.

6.39 g of magnesium nitrate hexahydrate $(Mg(NO_3)_3 \cdot 6H_2O)$ was added to the slurry and stirred to dissolve it therein. The slurry was spray-dried to provide powder of nickel oxide containing 20% by weight of magnesium oxide (MgO) in relation to nickel.

The powder of nickel oxide was ground with an agate mortar and was then heated at a temperature of 500° C. for three hours in the air and then at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 905 Å and an average particle size of 0.43 μm. The scanning electron micrograph of the particles showed that they were spherical and well dispersed.

Example 91

6.4 g of power of spherical particles of nickel oxide was dispersed in 20 mL of ion-exchanged water and 70 g of zirconia beads having a diameter of 1 mm were added. The resultant slurry was subjected to grinding with a planetary mill at a rate of 200 rpm for 10 minutes.

70 g of zirconia beads having a diameter of 1 mm were added to a dispersion of 1.0 g of magnesium oxide in 20 mL of ion-exchanged water and the obtained slurry was ground with a planetary mill at a rate of 200 rpm for 60 minutes.

The zirconia beads were separated from both the slurries and washed thoroughly to recover the nickel oxide and magnesium oxide therefrom, respectively, and thus aqueous slurries of nickel oxide and magnesium oxide were obtained. The slurries were then combined together and stirred thoroughly.

The resulting slurry was filtered, washed, and dried overnight at a temperature of 110° C. to provide powder of nickel oxide containing 20% by weight of magnesium oxide (MgO) in relation to nickel.

The powder of nickel oxide was ground with an agate mortar and was then heated at a temperature of 900° C. for three hours in a hydrogen stream to reduce the nickel oxide. After cooling and then standing at a temperature of 50° C. in a nitrogen stream containing 5% of oxygen for one hour to stabilize the resulting metallic nickel.

The thus obtained powder of metallic nickel containing magnesium oxide was ground with an agate mortar and immersed in 10% aqueous solution of acetic acid, followed by stirring for 30 minutes, filtering, washing and drying. This operation was repeated twice to remove the magnesium oxide from the powder of metallic nickel.

The thus obtained particles of metallic nickel were found to have a crystallite size of 948 Å and an average particle size of 0.60 μm. The scanning electron micrograph of the particles showed that they were spherical and well dispersed.

Comparative Example 1

Spherical particles of basic nickel carbonate were reduced to metallic nickel by heating at a temperature of 900° C. for three hours in a hydrogen stream. After cooling, the particles of metallic nickel were stood at a temperature of 50° C. in a nitrogen stream containing 5% of oxygen for one hour to stabilize the metallic nickel.

The thus obtained particles of metallic nickel were found to have a crystallite size of 995 Å and an average particle size of 18.35 μm. The scanning electron micrograph of the particles showed that they were non-spherical and fused together to form large particles.

Comparative Example 2

Spherical particles of nickel oxide were reduced to metallic nickel by heating at a temperature of 900° C. for three hours in a hydrogen stream. After cooling, the particles of metallic nickel were stood at a temperature of 50° C. in a nitrogen stream containing 5% of oxygen for one hour to stabilize the metallic nickel.

The thus obtained particles of metallic nickel were found to have a crystallite size of 983 Å and an average particle size of 33.62 μm. The scanning electron micrograph of the particles showed that they were non-spherical and fused together to form large particles.

INDUSTRIAL AVAILABILITY

As described above, according to the invention, fine spherical particles of metallic nickel which have high crystallinity as metallic nickel, an average particle size of 0.1–10 μm, preferably up to several microns, and most preferably of 0.1–1 μm, and a narrow particle size distribution by heating and reducing in a hydrogen atmosphere in the presence of a fusion preventive agent powder of nickel carbonate prepared by a specific emulsion method using nickel carbonate or nickel hydroxide as a starting material. The thus obtained powder of metallic nickel is suitable for use as inner electrodes of laminated ceramic capacitors.

What is claimed is:

1. A process for the production of powder comprised of fine spherical particles of metallic nickel having an average particle size of 0.05 μm to 10 μm, which comprises:

a first step of dissolving nickel carbonate and/or nickel hydroxide represented by the general formula (I)

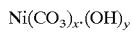

wherein x and y are numerals which satisfy the conditions: $0 \leq x \leq 1.5$ and $0 \leq y \leq 3$, respectively, in aqueous ammonia or in an aqueous solution of ammonia and at least one selected from the group consisting of ammonium carbonate, ammonium hydrogencarbonate, a carbonate of an alkali metal and a hydrogencarbonate of an alkali metal to prepare an aqueous solution of a nickel salt; and converting the aqueous solution of a nickel salt to a W/O emulsion containing droplets of the aqueous solution in a non-aqueous medium and then removing volatile components including ammonia from the droplets to form precipitates of nickel carbonate in the droplets, thereby providing fine spherical particles of nickel carbonate; and a second step of heating the particles of nickel carbonate in the presence of a fusion preventive agent that is a compound of at least one element selected from the group consisting of alkaline earth elements, aluminum, silicon and rare earth elements in an amount of 0.01% by weight to 30% by weight in terms of oxides based on the weight of the nickel carbonate in an atmosphere of hydrogen, thereby reducing the particles of nickel carbonate to particles of metallic nickel.

2. The process as claimed in claim 1 wherein the particles of nickel carbonate are heated and reduced at a temperature in the range of 300° C. to 1500° C. in a hydrogen atmosphere in the second step.

3. The process as claimed in claim 1 wherein the particles of nickel carbonate are reduced and then heated at a temperature in the range of 500° C. to 1500° C. in a non-oxidative atmosphere in the second step.

4. The process as claimed in claim 1 wherein the nickel carbonate is reduced and then the fusion preventive agent is removed from the resulting powder of metallic nickel in the second step.

5. The process as claimed in claim 1 wherein the alkaline earth metal is calcium or magnesium.

6. The process as claimed in claim 1 wherein fusion preventive agent is an oxide, a hydroxide, a carbonate or a sulfate of at least one element selected from the group consisting of alkaline earth elements, aluminum, silicon and rare earth elements, or a mixture of two or more of these compounds.

7. A process for the production of powder comprised of fine spherical particles of metallic nickel having an average particle size of 0.05 μm to 10 μm, which comprises:

a first step of dissolving nickel carbonate and/or nickel hydroxide represented by the general formula (I)

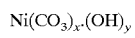

wherein x and y are numerals which satisfy the conditions: $0 \leq x \leq 1.5$ and $0 \leq y \leq 3$, respectively, in aqueous ammonia or in an aqueous solution of ammonia and at least one member selected from the group consisting of ammonium carbonate, ammonium hydrogencarbonate, a carbonate of an alkali metal and a hydrogencarbonate of an alkali metal to prepare an aqueous solution of a nickel salt; and converting the aqueous solution of a nickel salt to a W/O emulsion containing droplets of the aqueous solution in a non-aqueous medium and then removing volatile components including ammonia from the droplets to form precipitates of nickel carbonate in the droplets, thereby providing fine spherical particles of nickel carbonate; and a second step of heating the particles of nickel carbonate in an oxidative atmosphere to provide fine spherical particles of nickel oxide, and then heating the particles of nickel oxide in the presence of a fusion preventive agent that is a compound of at least one element selected from the group consisting of alkaline earth elements, aluminum, silicon and rare earth elements in an amount of 0.01% by weight to 30% by weight in terms of oxides based on the weight of the nickel oxide in an atmosphere of hydrogen, thereby reducing the particles of nickel oxide to particles of metallic nickel.

8. The process as claimed in claim 7 wherein the particles of nickel oxide are heated and reduced at a temperature in the range of 300° C. to 1200° C. in a hydrogen atmosphere in the second step.

9. The process as claimed in claim 7 wherein the particles of nickel oxide are reduced and then heated at a temperature in the range of 500° C. to 1500° C. in a non-oxidative atmosphere in the second step.

10. The process as claimed in claim 7 wherein the nickel oxide is reduced and then the fusion preventive agent is removed from the resulting powder of metallic nickel in the second step.

11. The process as claimed in claim 7 wherein the alkaline earth metal is calcium or magnesium.

12. The process as claimed in claim 7 wherein the fusion preventive agent is an oxide, a hydroxide, a carbonate or a sulfate, or a mixture of two or more of these compounds.

* * * * *